US012728057B2

(12) United States Patent
Lim et al.

(10) Patent No.: US 12,728,057 B2
(45) Date of Patent: Sep. 8, 2026

(54) SURGICAL FRAME AND METHOD FOR USE THEREOF FACILITATING ARTICULATABLE SUPPORT FOR A PATIENT DURING SURGERY

(71) Applicant: Warsaw Orthopedic, Inc., Warsaw, IN (US)

(72) Inventors: Roy Lim, Germantown, TN (US); Matthew Morrison, Cordova, TN (US); Richard Hynes, Melbourne Beach, FL (US)

(73) Assignee: Warsaw Orthopedic, Inc., Warsaw, IN (US)

( * ) Notice: Subject to any disclaimer, the term of this patent is extended or adjusted under 35 U.S.C. 154(b) by 0 days.

(21) Appl. No.: 19/550,646

(22) Filed: Feb. 26, 2026

(65) Prior Publication Data

US 2026/0191722 A1 Jul. 9, 2026

Related U.S. Application Data

(60) Continuation of application No. 18/634,424, filed on Apr. 12, 2024, which is a continuation of application
(Continued)

(51) Int. Cl.
*A61G 13/04* (2006.01)
*A61G 7/015* (2006.01)
(Continued)

(52) U.S. Cl.
CPC ............. *A61G 13/04* (2013.01); *A61G 7/015* (2013.01); *A61G 13/0054* (2016.11);
(Continued)

(58) Field of Classification Search
CPC .. A61G 13/04; A61G 13/0054; A61G 13/122; A61G 13/123; A61G 13/1245;
(Continued)

(56) References Cited

U.S. PATENT DOCUMENTS 3,227,440 A * 1/1966 Scott ...................... A61G 13/12 5/624
4,655,200 A * 4/1987 Knight ................. A61G 13/009 606/245
(Continued)

FOREIGN PATENT DOCUMENTS

WO WO-2005034827 A1 * 4/2005 ......... A61G 13/0054

*Primary Examiner* — David R Hare
(74) *Attorney, Agent, or Firm* — Sorell, Lenna & Schmidt, LLP

(57) ABSTRACT

An adjustable surgical frame for supporting a patient to facilitate different surgical approaches to the spine of the patient includes a first end, an opposite second end, and a length extending between the first and second ends thereof. The surgical frame has a longitudinal axis extending between the first and second ends along the length thereof, and includes a first support surface, a second support surface, and a third support surface. The surgical frame also includes an adjustable chest support, an adjustable hip and upper leg support, and an adjustable feet and lower leg support. The surgical frame is moveable between a first position, a second position, and a third position, and the chest support, the hip and upper leg support, and the feet and lower leg support are moveable to accommodate differently sized patients on the surgical frame.

20 Claims, 19 Drawing Sheets

Related U.S. Application Data

No. 16/924,449, filed on Jul. 9, 2020, now Pat. No. 11,957,626, which is a continuation of application No. 16/567,653, filed on Sep. 11, 2019, now Pat. No. 10,751,240, which is a division of application No. 15/239,293, filed on Aug. 17, 2016, now Pat. No. 10,414,485.

(60) Provisional application No. 62/206,064, filed on Aug. 17, 2015.

(51) Int. Cl.
*A61G 13/00* (2006.01)
*A61G 13/12* (2006.01)

(52) U.S. Cl.
CPC ......... *A61G 13/122* (2013.01); *A61G 13/123* (2013.01); *A61G 13/1245* (2013.01); *A61G 13/125* (2013.01); *A61G 13/129* (2013.01); *A61G 13/1295* (2013.01); *A61G 2200/325* (2013.01)

(58) Field of Classification Search
CPC ................ A61G 13/125; A61G 13/129; A61G 13/1295; A61G 7/015; A61G 2200/325; A61B 17/2255; A61H 1/0222
USPC .............................. 5/617, 618, 632; 128/845
See application file for complete search history.

(56) References Cited

U.S. PATENT DOCUMENTS 4,705,026 A * 11/1987 Chaussy .............. A61B 6/4417 378/177
4,866,796 A * 9/1989 Robinson ............... A61G 7/008 5/607
4,872,656 A * 10/1989 Brendgord ......... A61G 13/0036 5/624
4,915,101 A * 4/1990 Cuccia ................. A61H 1/0229 606/244
5,131,106 A * 7/1992 Jackson ................. A61G 13/00 5/607
5,860,899 A * 1/1999 Rassman .............. A61H 1/0222 601/24
6,076,525 A * 6/2000 Hoffman ............ A61G 13/0054 128/845
6,154,901 A * 12/2000 Carr ................... A61G 13/0054 5/601
6,260,220 B1 * 7/2001 Lamb ..................... A61G 13/12 5/607
6,934,987 B2 * 8/2005 Newkirk ................ A61G 13/12 5/607
7,234,180 B2 * 6/2007 Horton ............... A61G 13/0081 5/624
7,600,281 B2 * 10/2009 Skripps .................. A61G 13/10 5/624
7,669,262 B2 * 3/2010 Skripps .................. A61G 13/12 5/624
7,882,583 B2 * 2/2011 Skripps ................ A61G 13/101 5/621
8,635,725 B2 * 1/2014 Tannoury ........... A61G 13/0054 5/607
10,548,796 B2 * 2/2020 Lim ................... A61G 13/0054
10,888,484 B2 * 1/2021 Lim ................... A61G 13/0036
11,957,626 B2 * 4/2024 Lim ..................... A61G 13/125
2004/0133983 A1 * 7/2004 Newkirk ............ A61G 13/0036 5/624
2006/0123546 A1 * 6/2006 Horton ............... A61G 13/0054 5/624
2013/0283526 A1 * 10/2013 Gagliardi ........... A61G 13/0009 5/655.3
2014/0068861 A1 * 3/2014 Jackson ................. A61G 13/08 5/624

* cited by examiner

SURGICAL FRAME AND METHOD FOR USE THEREOF FACILITATING ARTICULATABLE SUPPORT FOR A PATIENT DURING SURGERY

BACKGROUND OF THE INVENTION

This application is a continuation of U.S. application Ser. No. 18/634,424, filed Apr. 12, 2024; which is a continuation of U.S. application Ser. No. 16/924,449, filed Jul. 9, 2020, now U.S. Pat. No. 11,957,626; which is a continuation of U.S. application Ser. No. 16/567,653, filed Sep. 11, 2019, now U.S. Pat. No. 10,751,240; which is a divisional of U.S. application Ser. No. 15/239,239, filed Aug. 17, 2016, now U.S. Pat. No. 10,548,796; which claims the benefit of U.S. Application Ser. No. 62/206,064, filed Aug. 17, 2015; all of which are incorporated by reference herein, in their entireties.

FIELD OF THE INVENTION

The present invention relates to a surgical frame and method for use thereof for supporting a patient during surgery. The surgical frame includes components that can be adjusted to facilitate positioning and repositioning of a patient during surgery and/or to accommodate differently sized patients. The components of the surgical frame are configured to afford supported movement of a patient during surgery. Preferred components of the surgical frame afford adjustment of the position of the upper body (including the chest), hips, legs, and feet of a patient. Additionally, the surgical frame includes components that affords movement of the entirety of the surgical frame. In doing so, the entirety of the surgical frame can be pivoted to further adjust the position of a patient during surgery including between a prone position and a lateral position. In a preferred embodiment of the surgical frame the patient can be positioned in a prone position, a lateral position, or an angled position there between, by way of example, at a 45 degree angle.

DESCRIPTION OF THE PRIOR ART

Traditionally, it has been difficult to articulate the bodies of patients during surgery. It is inherently difficult to position and reposition a patient under general anesthesia. To illustrate, multiple operating room personnel may be required for positioning a patient to afford a first surgical approach, and repositioning the patient to afford a second surgical approach may again require multiple operating room personnel.

Given the inherent difficulty in moving a patient during surgery, there exists a need for a surgical frame for supporting a patient thereon that affords positioning and repositioning of the patient to afford multiple surgical approaches.

SUMMARY OF THE INVENTION

The present invention in one preferred embodiment contemplates an adjustable surgical frame for supporting a patient to facilitate different surgical approaches to the spine of the patient, the adjustable surgical frame including a first end, an opposite second end, and a length extending between the first and second ends thereof, the surgical frame having a longitudinal axis extending between the first and second ends along the length thereof, the surgical frame being moveable between a first position, a second position, and a third position, the surgical frame being supported by a first support surface in the first position, a second support surface in the second position, and a third support surface in the third position, a chest support being configured to support the chest of the patient on the surgical frame, at least a portion of the chest support being movable in a direction transverse to the longitudinal axis of the surgical frame to facilitate positioning and repositioning of the chest of the patient thereon, a hip and upper leg support being configured to support the hips and upper legs of the patient on the surgical frame, at least a portion of the hip and upper leg support being pivotally adjustable to facilitate positioning and repositioning of the hips and upper legs of the patient, and a feet and lower leg support being configured to support the feet and the lower legs of the patient on the surgical frame, at least a portion of the feet and lower leg support being moveable in a direction aligned with the longitudinal axis of the surgical frame to facilitate positioning and repositioning of the feet and lower legs of the patient, where the coronal plane of the patient is oriented approximately horizontal when the surgical frame is in the first position, the coronal plane of the patient is oriented approximately 45° with respect to horizontal and vertical when the surgical frame is in the second position, the coronal plane of the patient is oriented approximately vertical when the surgical frame is in the third position.

The present invention in another preferred embodiment contemplates a method including providing the surgical frame having a first end, an opposite second end, and a length extending between the first and second ends, the surgical frame having a longitudinal axis extending between the first and second ends along the length thereof, the surgical frame including at least a chest support, a hip and upper leg support, and a feet and lower leg support, adjusting the chest support, the hip and upper leg support, and the feet and lower leg support to accommodate the size of the patient, positioning the patient on the surgical frame by contacting portions the chest of the patient with the chest support, contacting portions of the hips and upper legs of the patient with the hip and upper leg support, and contacting at least the feet of the patient with the feet and lower leg support, moving the surgical frame between a first position, a second position, and a third position, and performing surgery on the patient when the surgical frame is disposed in the first, second, and third positions, where the coronal plane of the patient is oriented approximately horizontal when the surgical frame is in the first position and the patient is supported thereby, the coronal plane of the patient is oriented approximately 45° with respect to horizontal and vertical when the surgical frame is in the second position and the patient is supported thereby, and the coronal plane of the patient is oriented approximately vertical when the surgical frame is in the third position and the patient is supported thereby.

The present invention in yet another preferred embodiment contemplates an adjustable surgical frame for supporting a patient to facilitate different surgical approaches to the spine of the patient, the adjustable surgical frame having a first end, an opposite second end, and a length extending between the first and second ends thereof, the surgical frame having a longitudinal axis extending between the first and second ends along the length thereof, the surgical frame having a first support surface, a second support surface, and a third support surface, a chest support, at least a portion of the chest support being movable in a direction transverse to the longitudinal axis of the surgical frame to facilitate positioning and repositioning of the chest of the patient thereon, a hip and upper leg support, at least a portion of the hip and upper leg support being pivotally adjustable to facilitate positioning and repositioning of the hips and upper legs of the patient, a feet and lower leg support, at least a portion of the feet and lower leg support being moveable in a direction aligned with the longitudinal axis of the surgical frame to facilitate positioning and repositioning of the feet and lower legs of the patient, where a first plane extends through the surgical frame, and the surgical frame is moveable between and supports the patient in a first position, a second position, and a third position, the surgical frame being supported by the first support surface in the first position, the second support surface in the second position, and the third support surface in the third position, the first plane being oriented approximately horizontal when the surgical frame is in the first position, the first plane being oriented approximately 45° with respect to horizontal and vertical when the surgical frame is in the second position, and the first plane being oriented approximately vertical when the surgical frame is in the third position.

These and other objects of the present invention will be apparent from review of the following specification and the accompanying drawings.

BRIEF DESCRIPTION OF THE DRAWINGS

The accompanying drawings, which are incorporated in and constitute a part of the specification, illustrate preferred embodiments of the invention and, together with the description, serve to explain the objects, advantages, and principles of the invention.

In the drawings.

DETAILED DESCRIPTION OF THE PREFERRED EMBODIMENT

The following description is intended to be representative only and not limiting, and many variations can be anticipated according to these teachings. Reference will now be made in detail to the preferred embodiments of this invention, examples of which are illustrated in the accompanying drawings.

As depicted in FIGS. 1A-5C, a surgical frame is generally indicated by the numeral 10. The surgical frame 10 is provided to facilitate positioning and repositioning of a patient P during surgery and/or to accommodate differently sized patients. To that end, the surgical frame 10 includes various features that facilitate supported movement of the patient P (FIG. 2A) during surgery. As discussed below, the surgical frame 10 affords positioning and repositioning of the upper body (including the chest), hips, legs, and feet of the patient P during surgery and/or to accommodate differently sized patients. Furthermore, the surgical frame 10 includes various features that facilitate pivotal movement of the entire surgical frame 10. In doing so, the surgical frame 10 can be pivoted to move the patient P from a prone-supported position, to a 45°-supported position, to a side-supported position, and back again.

Figure 1A:
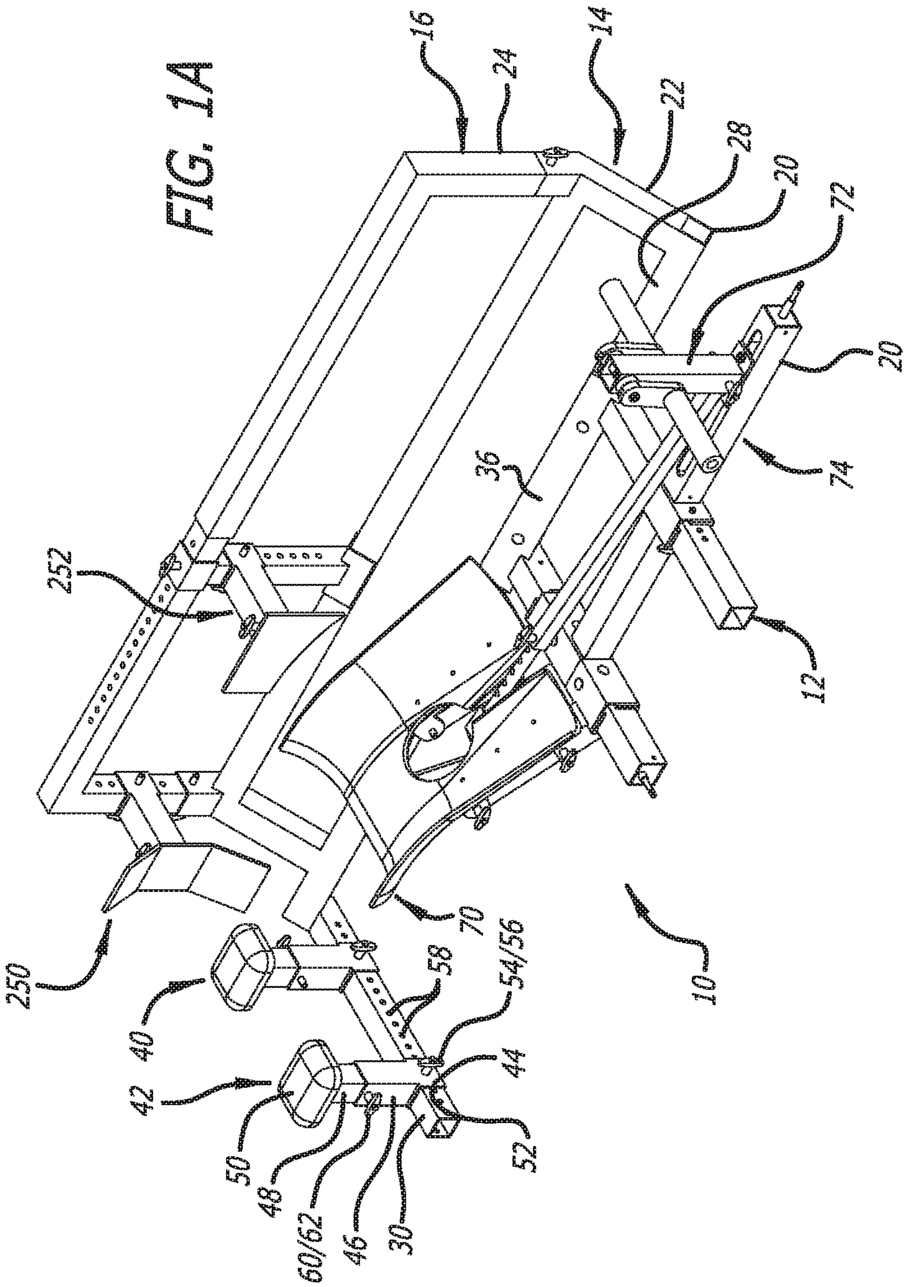
FIG. 1A is a top perspective view of a surgical frame according to the present invention.

As depicted in FIG. 1A, the surgical frame 10 includes a first portion 12, a second portion 14, and a third portion 16. As discussed below, the first and second portions 12 and 14 share some components therebetween, and the second and third portions 14 and 16 share some components therebetween. The first portion 12 includes support surfaces 20 that support the surgical frame 10 such that the patient P can be supported in the prone position, the second portion 14 includes support surfaces 22 that support the surgical frame 10 such that the patient P can be supported in the 45°-supported position, and the third portion 16 includes support surfaces 24 that support the surgical frame 10 such that the patient P can be supported in the side-supported position.

Figure 1B:
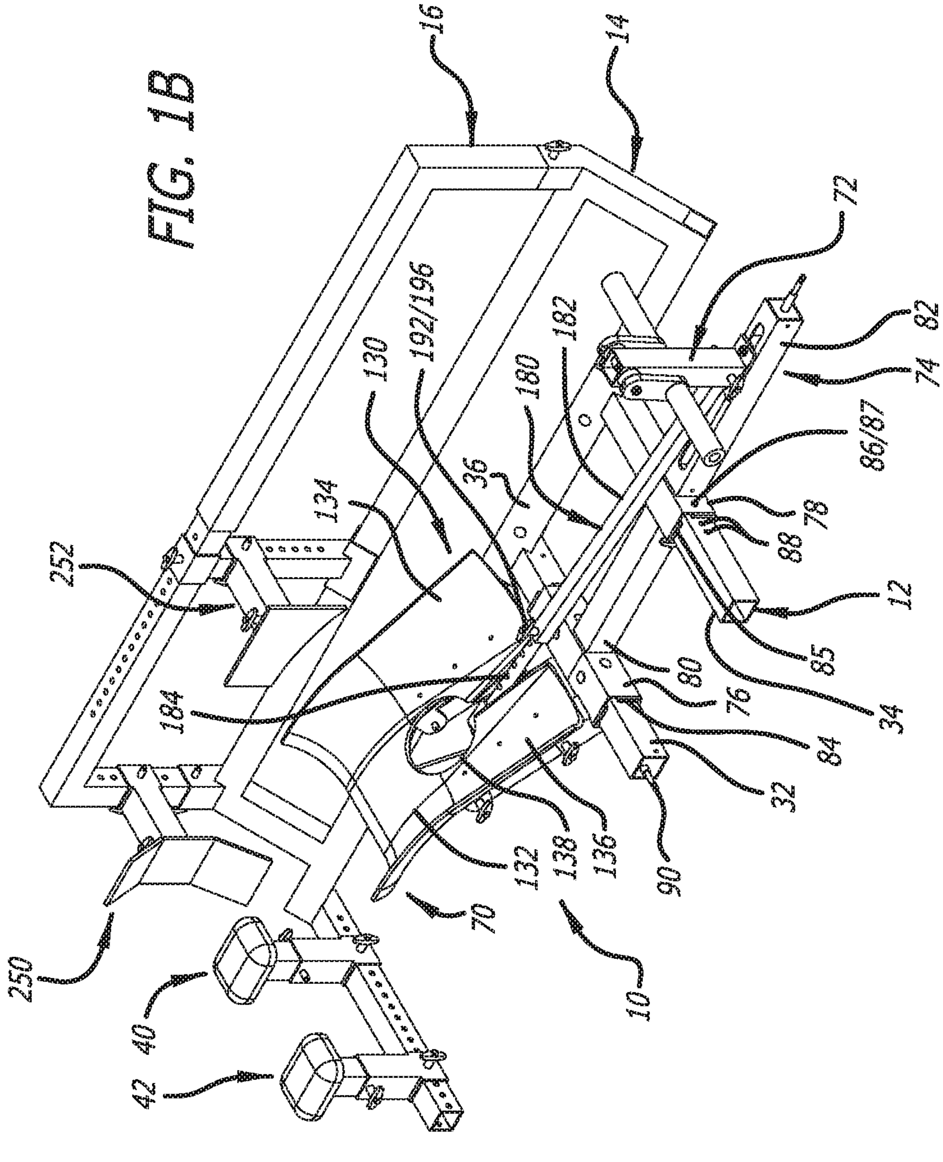
FIG. 1B is the perspective view of FIG. 1A identifying additional features thereof.

The first portion 12 includes various frame members. The first portion 12 includes a first frame member 28, a second frame member 30, a third frame member 32 (FIG. 1B), and a fourth frame member 34 (FIG. 1B). The third and fourth frame members 32 and 34 can be integrally formed with the first frame member 28. However, to afford an additional degree of movement, the third and fourth frame members 32 and 34 can be attached to a moveable frame member 36. As depicted in FIG. 1A, the second frame member 30 extends outwardly from the first frame member 28, and the third and fourth frame members 32 and 34 extend outwardly from the moveable frame member 36. The moveable frame member 36 includes a cavity 38 (FIG. 1E) for receiving the first frame member 28 therethrough, and the moveable frame member 36 is slidable along the first frame member 28. The moveable frame member 36 affords repositioning of the third and fourth frame members 32 and 34 along the first frame member 28 relative to the remainder of the surgical frame 10. The first frame member 28 and the moveable frame member 36 are axially aligned with the longitudinal axis of the surgical frame 10, and the second, third, and fourth frame members 30, 32, and 34 are perpendicular with respect to the first axially-aligned member 28.

The second frame member 30 supports first and second chest support mechanisms 40 and 42. Each of the first and second chest support mechanisms 40 and 42 include a collar portion 44, an upright portion 46, an extension portion 48, and a chest pad 50. As discussed below, components of the first and second chest support mechanisms 40 and 42 can be adjusted to position and reposition the upper body (including the chest) of the patient P during surgery and/or to accommodate differently sized patients.

The collar portions 44 of the first and second chest support mechanisms 40 and 42 are moveable with respect to the second frame member 30, and the extension portions 48 are moveable with respect to the upright portions 46. Furthermore, the chest pads 50 are attached to the extension portions 48. Movement of the collar portions 44 with respect to the second frame member 30, and movement of the extension portions 48 with respect to the upright portions 46 serves in facilitating positioning and repositioning of the chest pads 50.

Each of the collar portions 44 include an aperture 52 for receiving the second frame member 30 therethrough to facilitate slidable movement of the first and second chest support mechanisms 40 and 42 on the second frame member 30.

The first and second chest support mechanisms 40 and 42 each include a pin 54, and the collar portions 44 each include apertures 56 through opposed sides thereof for receiving one of the pins 54. Furthermore, the second frame member 30 includes various sets of apertures 58 along and through opposed sides thereof for receiving the pins 54. When the apertures 56 are aligned with one of the sets of apertures 58, insertion of one of the pins 54 through the apertures 56 and one of the sets of apertures 58 serves to hold the first and second chest support mechanisms 40 and 42 in position with respect to the second frame member 30. As such, the first and second chest support mechanisms 40 and 42 can be positioned and repositioned along the second frame member 30.

The extension portion 48 is partially received within the upright portion 46, and is moveable outwardly and inwardly with respect to the upright portion 46. Each of the first and second chest support mechanisms 40 and 42 include a pin 60, and the upright portions 46 each include apertures 62 through opposed sides thereof for receiving one of the pins 60. Furthermore, each of the extension portions 48 include various sets of apertures (not shown) along and through opposed sides thereof for receiving one of the pins 60. When the apertures 62 are aligned with one of the sets of apertures in one of the extension portions 48, insertion of one of the pins 60 through the apertures 62 and one of the sets of apertures in one of the extension portions 48 serves to hold the extension portion 48 (and the chest pad 50 attached thereto) in position with respect to the corresponding upright portion 46. As such, the chest pads 50 of the first and second chest support mechanisms 40 and 42 can be positioned and repositioned with respect to the upright portions 46 (and the remainder of the first and second chest support mechanisms 40 and 42).

The third and fourth frame members 32 and 34 support hip and upper leg support mechanism 70 and feet and lower leg support mechanism 72. As discussed below, components of the hip and upper leg support mechanism 70 and the feet and lower leg support mechanism 72 can be adjusted to position and reposition the lower body (including the hips, legs, and feet) of the patient P during surgery and/or to accommodate differently sized patients. In situations where the patient P is being positioned for back surgery, hip and upper leg support mechanism 70 offers a significant advantage to the surgeon by permitting the positioning of the patient's back into a preferred position for access to the surgical site. By way of example, during posterior lumbar surgery, the patient's back can by curved via movement of the hip and upper leg support mechanism 70 to a more distracted/open orientation on the posterior side between adjacent vertebrae so as to facilitate removal of the disc therebetween and/or subsequent insertion of a spinal implant therein.

As depicted in FIG. 1B, the third and fourth frame members 32 and 34 support sub-frame 74 which undergirds the hip and upper leg support mechanism 70 and feet and lower leg support mechanism 72. The sub-frame 74 is moveable along the third and fourth frame members 32 and 34. The sub-frame 74 includes a first collar member 76 (FIG. 1B), a second collar member 78, a first cross member 80, and a second cross member 82. The first and second collar members 76 and 78 are attached to one another with first cross member 80, and the second cross member 82 extends outwardly from the second collar portion 78. As depicted in FIG. 1B, the first and second cross members 80 and 82 are perpendicularly oriented with respect to the first and second collar members 76 and 78. The first and second collar members 76 and 78 and the first and second cross members 80 and 82 are welded or otherwise fixedly attached to one another.

The first and second collar members 76 and 78 are hollow. As such, the first and second collar members 76 and 78 include cavities 84 and 85, respectively, extending therethrough from one end to the other end thereof. The third frame member 32 is received through the first collar member 76, and the fourth frame member 34 is received through the second collar member 78. As such, the first and second collar members 76 and 78 are moveable along the third and fourth frame members 32 and 34, respectively. The movement of the first and second collar members 76 and 78 along the third and fourth frame members 32 and 34, respectively, facilitates movement of the sub-frame 74 (and hence, the hip and upper leg support mechanism 70 and the feet and lower leg support mechanism 72) relative to the remainder of the surgical frame 10. As discussed above, the moveable frame member 36 also affords repositioning of the third and fourth frame members 32 and 34 (and the sub-frame 74, and the hip and upper leg support mechanism 70 and the feet and lower leg support mechanism 72 supported by the sub-frame 74) along the first frame member 28. As such, the positions of the hip and upper leg support mechanism 70 and the feet and lower leg support mechanism 72 can be changed by moving the moveable frame member 36 along the first frame member 28, and by moving the sub-frame 74 along the third and fourth frame members 32 and 34.

The sub-frame includes a pin 86, and the second collar member 78 includes apertures 87 through opposed sides thereof for receiving the pin 86. Furthermore, the fourth frame member 34 includes various sets of apertures 88 along and through opposed sides thereof for receiving the pin 86. When the apertures 87 are aligned with one of the sets of apertures 88, insertion of the pin 86 through the apertures 87 and the sets of apertures 88 serves to hold the second collar member 78 (and hence, the sub-frame 74) in position relative to the fourth frame member 34.

As discussed above, the first and second collar members 76 and 78 of the sub-frame 74 are moveable along the third and fourth frame members 32 and 34, respectively. To facilitate such movement (especially when the patient P is positioned on the surgical frame 10), the third frame member 32 and the first collar member 76 include an internal mechanism (not shown) that translates rotational movement of a shaft 90 extending through the third frame member 32 into movement of the sub-frame 74 (and the hip and upper leg support mechanism 70 and the feet and lower leg support mechanism 72 attached thereto). Rotation of the shaft 90 in one direction moves the sub-frame 74 (and the hip and upper leg support mechanism 70 and the feet and lower leg support mechanism 72 attached thereto) toward the first frame member 28, and rotation of the shaft 90 in the other direction moves the sub-frame 74 (and the hip and upper leg support mechanism 70 and the feet and lower leg support mechanism 72 attached thereto) away from the first frame member 28. Thus, via movement of the sub-frame 74, the hip and upper leg support mechanism 70 and the feet and lower leg support mechanism 72 can be moved toward and away from the first frame member 28 to position and reposition the lower body of the patient P during surgery and/or to accommodate differently sized patients.

Figure 1C:
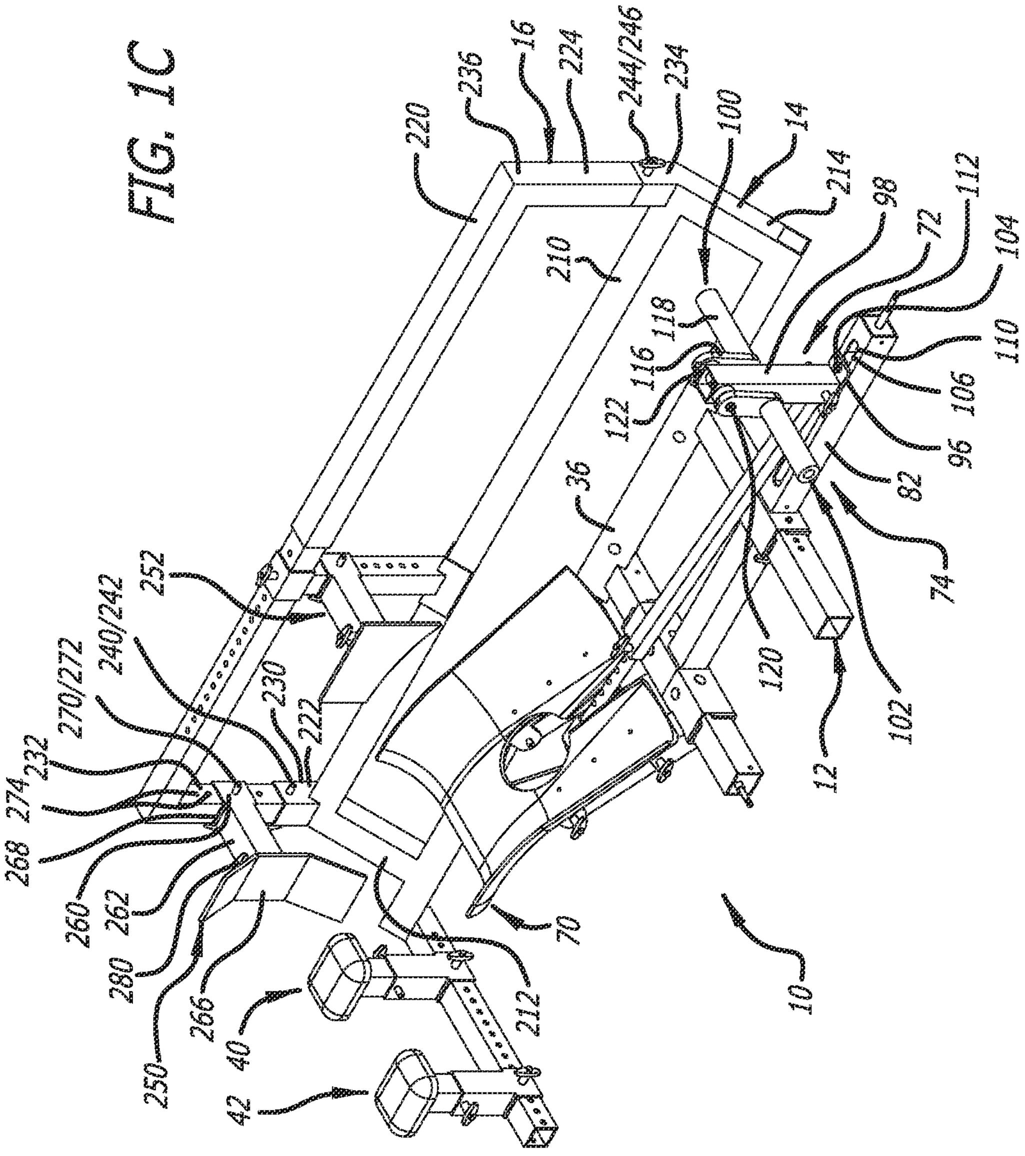
FIG. 1C is the perspective view of FIGS. 1A and 1B identifying additional features thereof.

As depicted in FIG. 1C, the feet and lower leg support mechanism 72 is moveably attached to the second cross member 82. The feet and lower leg support mechanism 72 includes a flange portion 96, an upright portion 98, a first foot support 100, and a second foot support 102.

The flange portion 96 attaches the feet and lower leg support mechanism 72 to the second cross member 82 using bolts 104 attached to a truck 106 moveable within the second cross member 82. The bolts 104 are attached to the truck 106 through a slot 110 formed in the second cross member 82. The truck 106 is confined within the interior of the second cross member 82, and the slot 110 affords movement of both the truck 106 and the feet and lower leg support mechanism 72 attached thereto relative to the second cross member 82. To facilitate such movement (especially when the patient P is positioned on the surgical frame 10), the second cross member 82 includes an internal mechanism (not shown) that translates rotational movement of a shaft 112 extending through the second cross member 82 into movement of the truck 106 (and the feet and lower leg support mechanism 72 attached thereto). Rotation of the shaft 112 in one direction moves the truck 106 (and the feet and lower leg support mechanism 72 attached thereto) toward the fourth frame member 34, and rotation of the shaft 112 in the other direction moves the truck 106 (and the feet and lower leg support mechanism 72 attached thereto) away from the fourth frame member 34. As such, movement of the feet and lower leg support mechanism 72 toward and away from the fourth frame member 34 serves to position and reposition the legs of the patient P during surgery and/or to accommodate differently sized patients.

The first and second foot supports 100 and 102 are provided on opposed sides of the upright portion 98. The first and second foot supports 100 and 102 each include an arm portion 116 and an extension portion 118. The arm portions 116 of the first and second foot supports 100 and 102 are attached to either side of the upright portion 98 using a pin 120, and washers 122 received on the pin 120 are positioned between the arm portions 116 and the upright member 98. The pin 120 allows the first and second foot supports 100 and 102 to pivot. The extension portions 118 support the feet of the patient P thereon, and, as the patient is positioned and repositioned, the extension portions 118 move via pivotal movement of the first and second foot supports 100 and 102 to accommodate such positioning.

As depicted in FIG. 1B, the hip and upper leg support mechanism 70 includes a patient support platform 130 for anteriorly supporting the hips and the upper legs of the patient P. As discussed below, the angle and location of the patient support platform 130 can be adjusted to position and reposition the hips and the upper legs of the patient P during surgery and/or to accommodate differently sized patients.

The patient support platform 130 includes a body portion 132, a first leg portion 134, and a second leg portion 136. A slot 138 separates the first and second leg portions 134 and 136 from one another. The body portion 132 serves in supporting the hips of the patient P, the first and second leg portions 134 and 136 serves in supporting the upper legs of the patient P, and the slot 138 serves to limit contact of the support platform 130 with the groin area of the patient P.

Figure 1D:
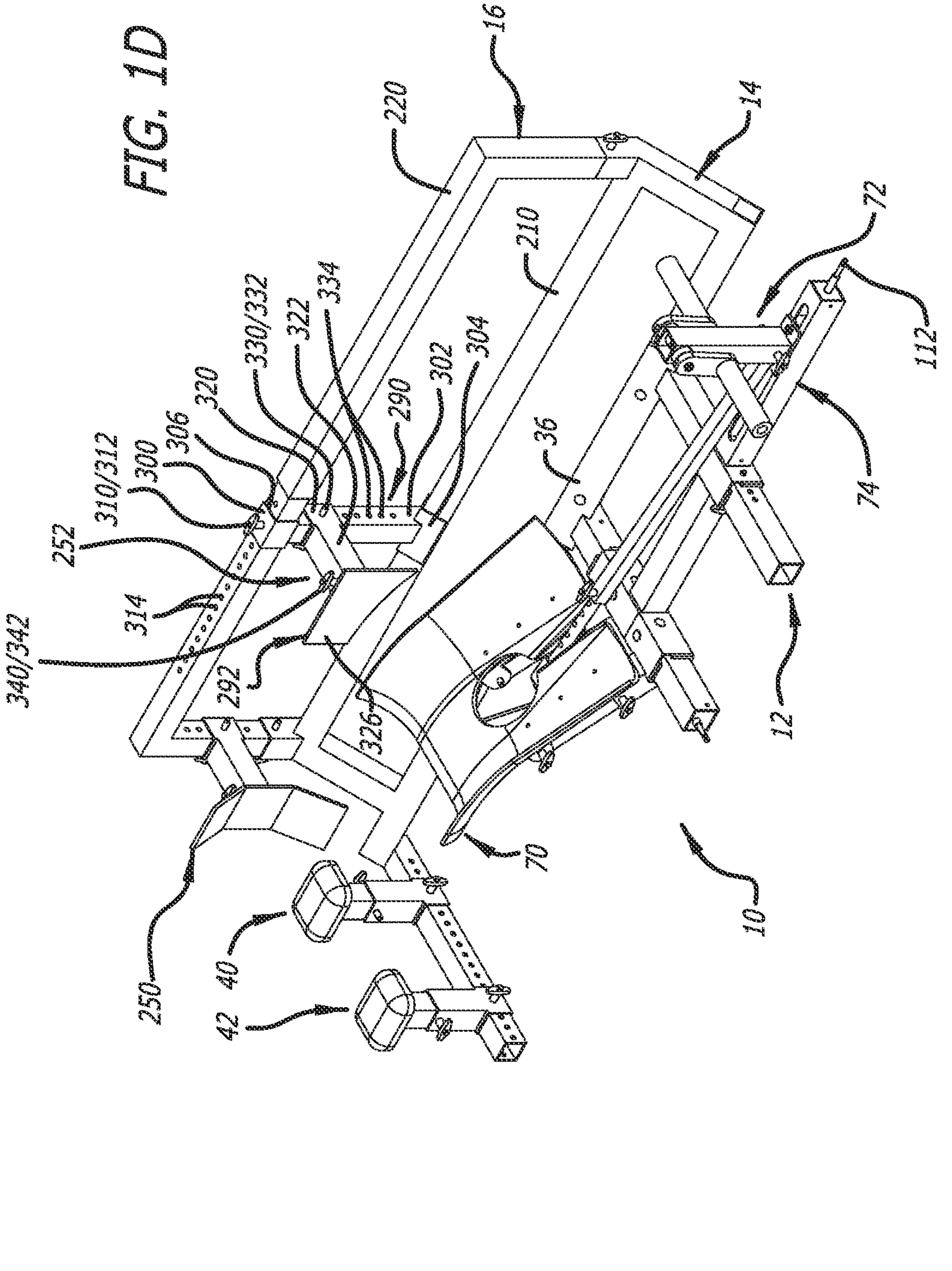
FIG. 1D is the perspective view of FIGS. 1A, 1B, and 1C identifying additional features thereof.
Figure 1E:
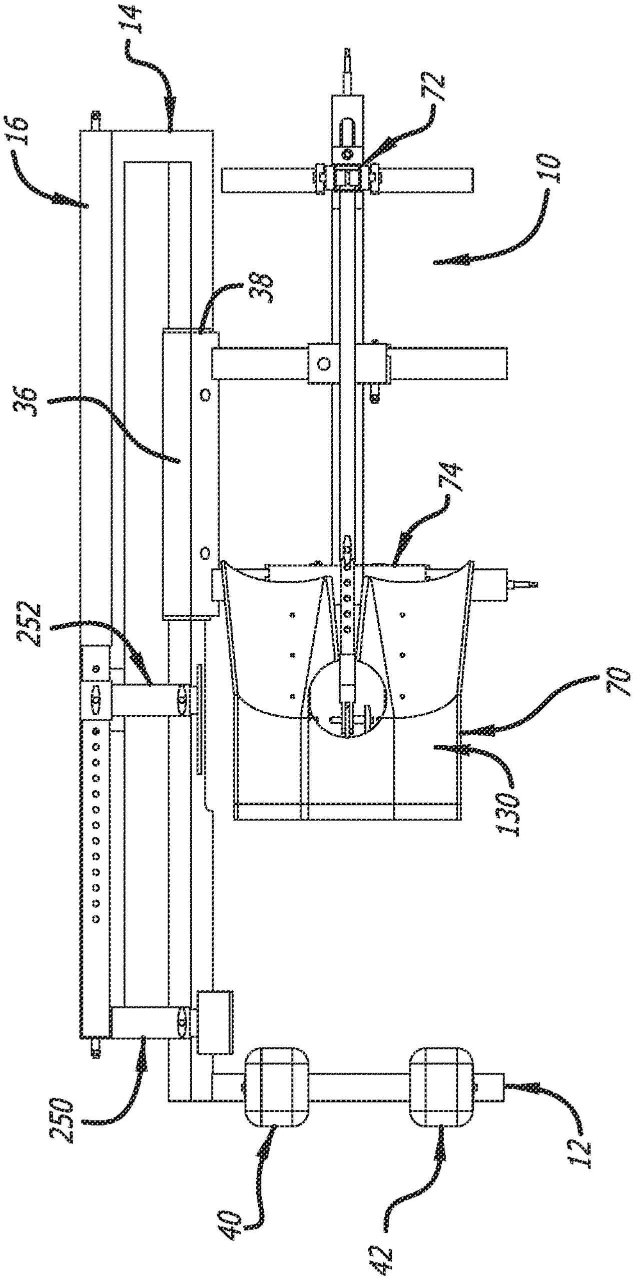
FIG. 1E is a top plan view of the surgical frame of FIG. 1A.
Figure 1F:
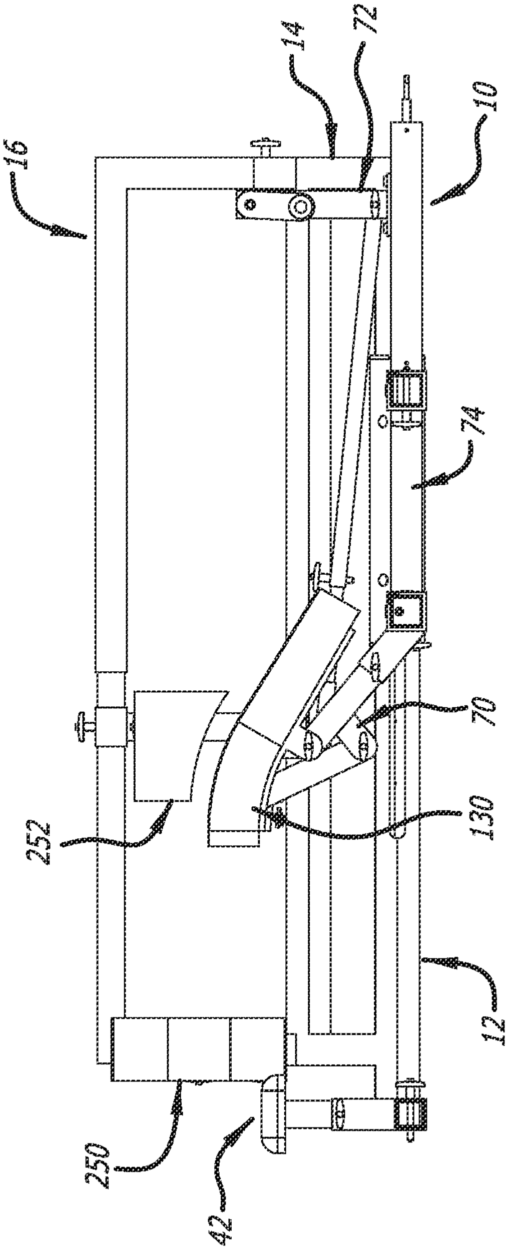
FIG. 1F is a side elevational view of the surgical frame of FIG. 1A.
Figure 1G:
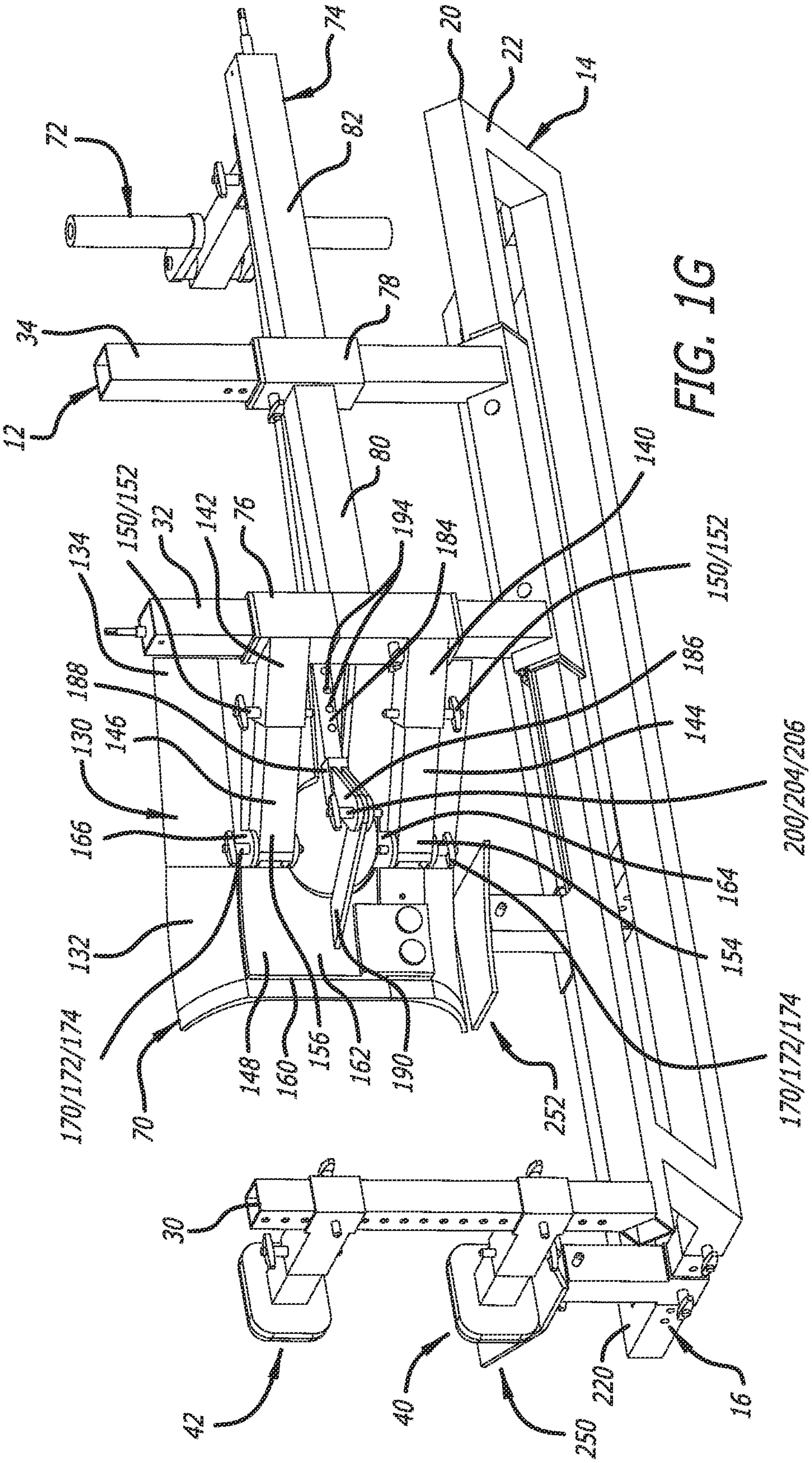
FIG. 1G is a bottom perspective view of the surgical frame of FIG. 1A.

As depicted in FIG. 1G, the hip and upper leg support mechanism 70 also includes a first angled portion 140, a second angled portion 142, a first extension portion 144, a second extension portion 146, and a plate 148. The first and second angled portions 140 and 142, the first and second extension portions 144 and 146, and the plate 148 support the patient support platform 130. As discussed below, the patient support platform 130 is attached to the plate 148, and the plate 148 is pivotally attached to the first and second extension portions 144 and 146. Furthermore, the first and second extension portions 144 and 146 are moveable outwardly and inwardly with respect to the first and second angled portions 140 and 142. Thus, pivotal movement of the plate 148, and outward and inward movement of the extension portions 144 and 146 can affect the position of the patient support platform 130. The pivotal movement of the plate 148 affects the angle of the patient support platform 130, and the inward and outward movement of the extension portions 144 and 146 affects the location of the patient support platform 130.

The first and second angled portions 140 and 142 are attached to the first collar member 76 of the sub-frame 74, and the first and second extension portions 144 and 146 are partially received within the first and second angled portions 140 and 142, respectively. As seen in FIG. 1G, the first and second angled portions 140 and 142 extend upwardly at an angle from the first collar member 76. The first and second extension portions 144 and 146 are moveable outwardly and inwardly within the first and second angled portions 140 and 142. Furthermore, because the first and second extension portions 144 and 146 are received in the first and second angled portions 140 and 142, the angles of the first and second extension portions 144 and 146 correspond to the angles of the first and second angled portions 140 and 142. Each of the first and second angled portions 140 and 142 include apertures 150 through opposed sides thereof, and each of the first and second extension portions 144 and 146 include various sets of apertures (not shown) along and through opposed sides thereof. When the apertures 150 are aligned with one of the sets of apertures, insertion of pins 152 therethrough serves to hold the first and second extension portions 144 and 146 in position with respect to the first and second angled portions 140 and 142. As such, the first and second extension portions 144 and 146 can be positioned and repositioned with respect to the first and second angled portions 140 and 142.

End portions 154 and 156 of the first and second extension portions 144 and 146, respectively, are attached to the plate 148. The plate 148 is attached to the patient support platform 130, and the plate 148 includes a top surface 160 and a bottom surface 162. The top surface 160 contacts the patient support platform 130, and the bottom surface 162 includes a first clevis 164 and a second clevis 166 facilitating attachment of the first and second extension portions 144 and 146 to the plate 148. Attachment of the end portions 154 and 156 to plate 148 allows for pivotal movement of the plate 148 (and the patient support platform 130 attached thereto) with respect to the first and second extension portions 144 and 146. Furthermore, movement of the first and second extension portions 144 and 146 with respect to the first and second angled portions 140 and 142 allows for outward and inward movement of plate 148 (and the patient support platform 130 attached thereto). As such, the angle and location of the patient support platform 130 can be adjusted to position and reposition the hips and the upper legs of the patient P during surgery and/or to accommodate differently sized patients.

The first and second clevises 164 and 166 can be integrally formed with the plate 148. The end portion 154 is received in the first clevis 164 and the second end portion 156 is received in the second clevis 166. Each of the first and second clevises 164 and 166 include apertures 170 therethrough, and each of the end portions 154 and 156 include apertures (not shown) therethrough on opposed sides of the first and second extension portions 144 and 146. Fixed pins 172 can be received through the apertures 170 and the apertures to pivotally attach the end portions 154 and 156 to the first and second clevises 164 and 166, respectively. Furthermore, each of the fixed pins 172 includes a handle 174 that can be tightened onto the fixed pins 172 to hold the first and second clevises 164 and 166 in position relative to the end portions 154 and 156.

As discussed above, given that the plate 148 is attached to the patient support platform 130, the pivotal movement of the plate 148 affords corresponding pivotal movement of the patient support platform 130 attached thereto. Thus, tightening of the handles 174 onto the fixed pins 172 serves to hold the plate 148 and the patient support platform 130 attached thereto in position relative to the first and second extension portions 144 and 146. Furthermore, as discussed above, given that the plate 148 is attached to the first and second extension portions 144 and 146, movement of the first and second extension portions 144 and 146 outwardly and inwardly affords corresponding outward and inward movement of the plate 148 and the patient support platform 130 attached thereto. Thus, insertion of the pins 152 through one of the sets of apertures in each of the first and second extension portions 144 and 146 serves to hold the first and second extension portions 144 and 146, the plate 148 attached to the first and second extension portions 144 and 146, and the patient support platform 130 attached to the plate 148 in position relative to the first and second angled portions 140 and 142.

As depicted in FIGS. 1B and 1G, the position of the patient support platform 130 can be affected during surgery using telescoping mechanism 180. The telescoping mechanism 180 extends from the feet and lower leg support mechanism 72 to the plate 148 of the hip and upper leg support mechanism 70. The telescoping mechanism 180 includes a base portion 182 attached to the upright portion 98 of the feet and lower leg support mechanism 72, an extension portion 184 partially received in the base portion 182, and a clevis 186 provided on an end portion 188 of the extension portion 184. As discussed below, the lengthening and shortening of the telescoping mechanism 180 can be used to adjust the angle of the patient support platform 130.

The extension portion 184 is moveable outwardly and inwardly with respect to the base portion 182. Moving the extension portion 184 outward lengthens the telescoping mechanism 180, and moving the extension portion 184 inward shortens the telescoping mechanism 180. The base portion 182 includes apertures 192 in opposed sides thereof, and the extension portion 184 includes sets of apertures 194 along and through opposed sides thereof. When the apertures 192 are aligned with one of the sets of apertures 194, insertion of a pin 196 through the apertures 192 and one of the sets of apertures 194 serves to hold the base portion 182 and the extension portion 184 in position with respect to one another. As such, the extension portion 184 can be positioned and repositioned with respect to the base portion 182.

The clevis 186 is attached to an extension arm 190 depending downwardly from the plate 148. The clevis 186 can be integrally formed with the extension portion 184, and the extension arm 190 can be integrally formed with plate 148. The extension arm 190 is received within the clevis 186. As depicted in FIG. 1G, the clevis 186 includes apertures 200 therethrough, and the extension arm 190 includes an aperture (not shown). Fixed pin 204 can be received through the apertures 200 and the aperture in the extension arm 190 to attach the extension portion 184 to the extension arm 190. Furthermore, the fixed pin 204 includes a handle 206 that can be tightened onto the fixed pin 204 to hold the clevis 186 in position relative to the extension arm 190.

The lengthening or shortening of the telescoping mechanism 180 can be used to adjust the angle of the patient support platform 130. As discussed above, the plate 148 is pivotally attached to the first and second extension portions 144 and 146 via the first and second clevises 164 and 166. The extension arm 190 attached to the plate 148 serves as a moment arm to facilitate pivotal movement of the plate 148 on the first and second clevises 164 and 166. Movement of the extension arm 190 toward the first and second chest support mechanisms 40 and 42 serves to move the body portion 132 of the patient support platform 130 upwardly, and movement of the extension arm 190 toward the feet and lower leg support mechanism 72 serves to move the body portion 132 of the patient support platform 130 downwardly. Lengthening of the telescoping mechanism 180 moves the extension arm 190 toward the first and second chest support mechanisms 40 and 42, and shortening of the telescoping mechanism 180 moves the extension arm 190 toward the feet and lower leg support mechanism 72. As such, by adjusting the telescoping mechanism 180, the angle of the plate 148 and the patient support platform 130 attached thereto can be adjusted to position and reposition the hips and the upper legs of the patient P during surgery and/or to accommodate differently sized patients.

As depicted in FIG. 1C, the second portion 14 of the surgical frame 10 includes the first frame member 28, a fifth frame member 210, a sixth frame member 212, and a seventh frame member 214. The first frame member 28 is shared between the first and second portions 12 and 14 of the surgical frame 10, and the sixth and seventh frame members 212 and 214 connect the first and fifth frame members 28 and 210 together. Furthermore, the third portion 16 of the surgical frame 10 includes the fifth frame member 210, an eighth frame member 220, a ninth frame member 222, and a tenth frame member 224. The fifth frame member 210 is shared between the second and third portions 14 and 16 of the surgical frame 10, and the ninth and tenth frame members 222 and 224 connect the fifth and eighth frame members 210 and 220 together.

A portion of the third portion 16 can be separable from the remainder of the surgical frame 10. As depicted in FIG. 1C, the ninth and tenth frame members 222 and 224 can be formed of two components that are removably attached to one another. For example, the ninth frame member 222 includes a first portion 230 and a second portion 232, and tenth frame member 224 includes a first portion 234 and a second portion 236. The first portion 230 is attached to the fifth frame member 210 and the second portion 232 is attached to the eighth frame member 220, and the first portion 234 is attached to the fifth frame member 210 and the second portion 236 is attached to the eighth frame member 220. The first portion 230 includes apertures 240 through opposed sides thereof, the second portion 232 includes apertures (not shown) through opposed sides thereof, and a pin 242 is inserted through the apertures 240 in the first portion 230 and the apertures in the second portion 232 to facilitate removable attachment between the first and second portions 230 and 232. Furthermore, the first portion 234 includes apertures 244 through opposed sides thereof, the second portion 236 includes apertures (not shown) through opposed sides thereof, and a pin 246 is inserted through the apertures 244 in the first portions 234 and the apertures in the second portion 236 to facilitate removable attachment between the first and second portions 234 and 236. As such, the eighth frame member 220, and the second portions 232 and 236 of the ninth and tenth frame members 222 and 224, respectively, can be removed from the remainder of the surgical frame 10.

In addition to the first and second chest support mechanisms 40 and 42, the hip and upper leg support mechanism 70, and the feet and lower leg support mechanism 72, the surgical frame 10 includes a lateral shoulder/upper torso mechanism 250 and a lateral hip support mechanism 252. As discussed below, components of the lateral shoulder/upper torso mechanism 250 and the lateral hip support mechanism 252 can be adjusted to position and reposition the upper body (including the chest) and the hips of the patient P during surgery and/or to accommodate differently sized patients.

As depicted in FIG. 1C, the lateral shoulder/upper torso mechanism 250 is moveable along the second portion 232 of the ninth frame member 222, and also moveable outwardly and inwardly with respect to the ninth frame member 222. The lateral shoulder/upper torso mechanism 250 includes a collar portion 260, a base portion 262, an extension portion 264 (FIG. 3A), and a shoulder/upper torso contacting portion 266. The collar portion 260 is moveable along the ninth frame member 222, and the extension portion 264 is partially received in the base portion 262 and is moveable outwardly and inwardly with respect thereto.

The collar portion 260 includes an aperture 268 for receiving the second portion 232 of the ninth frame member 222 therethrough to facilitate slidable movement of the lateral shoulder/upper torso mechanism 250 on the ninth frame member 222. The lateral shoulder/upper torso mechanism 250 includes a pin 270, the collar portion 260 includes apertures 272 through opposed sides thereof for receiving the pin 270, and the second portion 232 of the ninth frame member 222 includes various sets of apertures 274 along and through opposed sides thereof for receiving the pin 270. When the apertures 272 are aligned with one of the sets of apertures 274, insertion of the pin 270 through the apertures 272 and one of the sets of apertures 274 serves to hold the lateral shoulder/upper torso mechanism 250 in position with respect to the ninth frame member 222. As such, the lateral shoulder/upper torso mechanism 250 can be positioned and repositioned along the ninth frame member 222.

The extension portion 264 is partially received within the base portion 262, and is moveable outwardly and inwardly with respect to the base portion 262. The lateral shoulder/upper torso mechanism 250 includes a pin 280, the base portion 262 includes apertures (not shown) through opposed sides thereof for receiving the pin 280, and the extension portion 264 includes various sets of apertures (not shown) along and through opposed sides thereof for receiving the pin 280. When the apertures in the base portion 262 are aligned with one of the sets of apertures in the extension portion 264, insertion of the pin 280 through the apertures in the base portion 262 and one of the sets of apertures in the extension portion 264 serves to hold the position of the extension portion 264 (and the shoulder/upper torso contacting portion 266 attached thereto) in position with respect to the base portion 262. As such, the shoulder/upper torso contacting portion 266 of the lateral shoulder/upper torso support mechanism 250 can be positioned and repositioned with respect to the base portion 262 (and the remainder of the lateral shoulder/upper torso mechanism 250).

As depicted in FIG. 1D, the lateral hip support mechanism 252 is moveable along both the fifth frame member 210 and the eighth frame member 220, and also moveable outwardly and inwardly with respect to the fifth frame member 210 and the eighth frame member 220. The lateral hip support mechanism 252 includes a first portion 290 and a second portion 292. The first portion 290 is supported between the fifth frame member 210 and the eighth frame member 220, and the second portion 292 is attached by the first portion 290.

The first portion 290 of the lateral hip support mechanism 252 includes a collar portion 300, a base portion 302, and a slidable portion 304. The collar portion 300 is moveable with respect to the eighth frame member 220, and the slidable portion 304 is moveable with respect to the fifth frame member 210. The collar portion 300 includes an aperture 306 for receiving the eighth frame member 220 therethrough to facilitate slidable movement of the first portion 290 on the eighth frame member 220. Furthermore, the slidable portion 304 is configured to rest on the fifth frame member 210 to facilitate slidable movement thereon. The first portion 290 includes a pin 310, the collar portion 300 includes apertures 312 through opposed sides thereof for receiving the pin 310, and the eighth frame member 220 includes various sets of apertures 314 along and through opposed sides thereof for receiving the pin 310. When the apertures 312 are aligned with one set of the apertures in the eighth frame member 220, insertion of the pin 310 through the apertures 312 and one of the sets of apertures 314 in the eighth frame member 220 serves to hold the position of the first portion of the lateral hip support mechanism 252 relative to the fifth frame member 210 and the eighth frame member 220. As such, the first portion 290 (and the second portion 292 attached thereto) of the lateral hip support mechanism 252 can be positioned and repositioned with respect to the fifth frame member 210 and the eighth frame member 220.

The second portion 292 of the lateral hip support mechanism 252 includes a collar portion 320, a base portion 322, an extension portion 324 (FIG. 3A), and a hip-contacting portion 326. The collar portion 320 is moveable along the base portion 302 of the first portion 290, and the extension portion 324 is partially received within the base portion 302 and is moveable outwardly and inwardly with respect thereto.

To facilitate movement of the second portion 292 relative to the first portion 290, the lateral hip support mechanism 252 includes a pin 330, the collar portion 320 includes apertures 332 through opposed sides thereof for receiving the pin 330 therethrough, and the base portion 302 of the first portion 290 includes various sets of apertures 334 along and through opposed sides thereof for receiving the pin 330 therethrough. When the apertures 332 are aligned with one of the sets of apertures 334, insertion of the pin 330 through the apertures 332 and one of the sets of apertures 334 serves to hold the second portion 292 in position with respect to the base portion 302 of the first portion 290. As such, the second portion 292 of the hip support mechanism 252 can be positioned and repositioned along the base portion 302 of the first portion 290.

Additionally, to facilitate movement of the extension portion 324 relative to the base portion 322, the lateral hip support mechanism 252 includes a pin 340, the base portion 322 includes apertures 342 through opposed sides thereof for receiving the pin 340, and the extension portion 324 includes various sets of apertures (not shown) along and through opposed sides thereof for receiving the pin 340. When the apertures 342 are aligned with one of the sets of apertures, insertion of the pin 340 through the apertures 342 and one of the sets of apertures serves to hold the extension portion 324 (and the hip-contacting portion 326 attached thereto) in position with respect to the base portion 322. As such, the hip-contacting portion 326 of the lateral hip support mechanism 252 can be positioned and repositioned with respect to the base portion 322 (and the remainder of the lateral hip support mechanism 252).

As discussed above, the surgical frame 10 affords positioning and repositioning of the upper body (including the chest), hips, legs, and feet of the patient P during surgery and/or to accommodate differently sized patients. In summary, the locations of chest support pads 50 of the first and second chest support mechanisms 40 and 42 can be adjusted to position and reposition the upper body (including the chest) of the patient P. The angle and location of the patient support platform 130 of the hip and upper leg support mechanism 70 can be adjusted to position and reposition the hips and upper legs of the patient P. The location of the feet and lower leg support mechanism 72 can be adjusted to position and reposition the legs of the patient P. The positions of the hip and upper leg support mechanism 70 and the feet and lower leg support mechanism 72 (and the patient P received thereon) also can be changed by moving the moveable frame member 36 along the first frame member 28, and by moving the sub-frame 74 along the first and second frame members 32 and 34. Furthermore, the location of the shoulder/upper torso contacting portion 266 of the lateral shoulder/upper torso mechanism 250, and the location of the hip-contacting portion 326 of the lateral hip support mechanism 252 can be adjusted to position and reposition the shoulders and hips of the patient P. The movement afforded by the various mechanisms of the surgical frame 10 affords articulation of portions of the body of the patient P to change the degree of surgical access to the body during surgery. The movement afforded by the various mechanisms of the surgical frame 10 also affords the accommodation of differently sized patients.

Figure 2A:
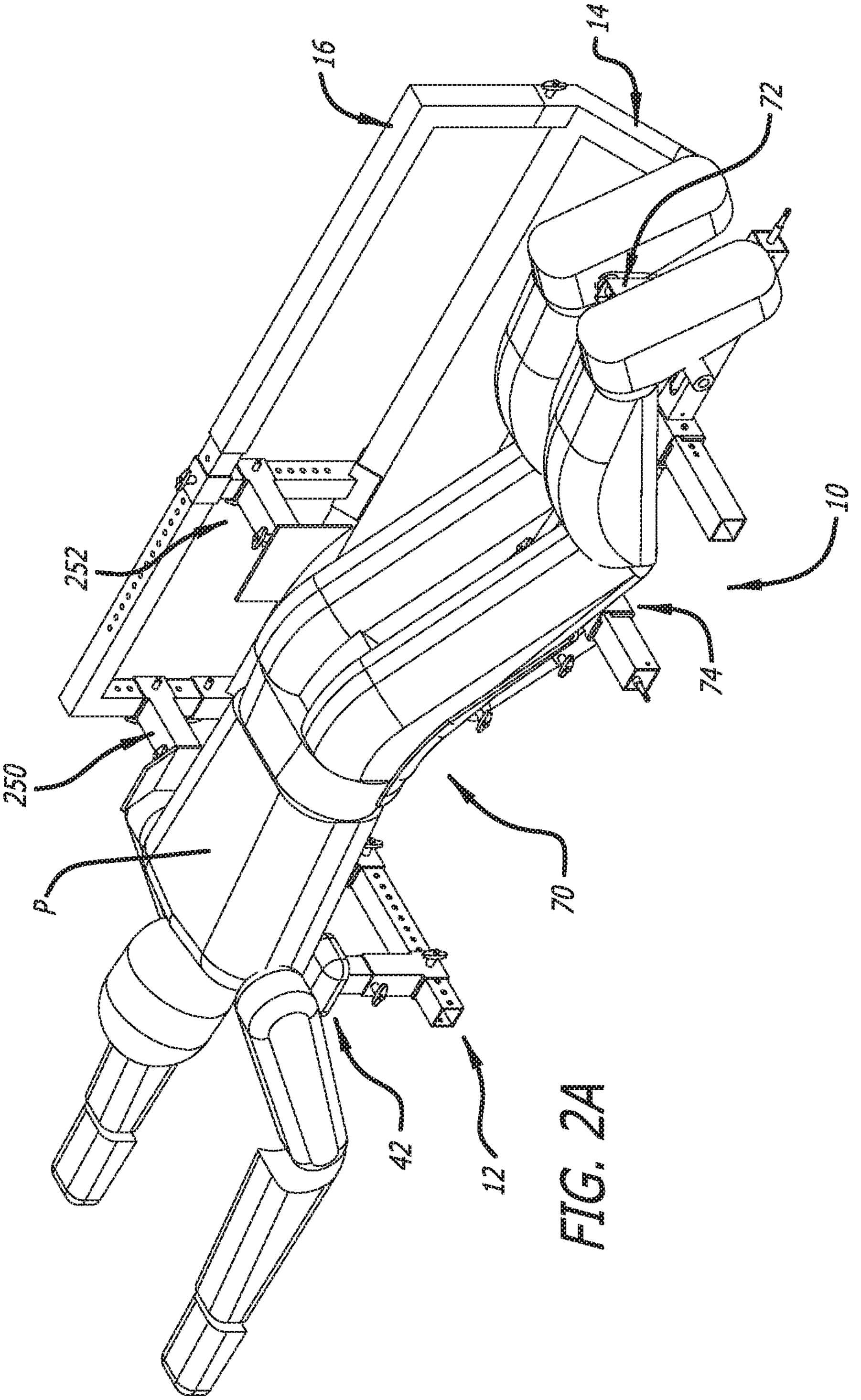
FIG. 2A is a top perspective view of the surgical frame of FIG. 1A, components thereof having been adjusted to maintain a patient in a first position.

FIGS. 2A-5C serve in illustrating the articulation of the body of the patient P afforded by the various mechanisms of the surgical frame 10. FIGS. 2A-2C depict the patient P positioned on the surgical frame 10 in the prone position. The body contacting portions of the first and second chest support mechanisms 40 and 42, the hip and upper leg support mechanism 70, the feet and lower leg support mechanism 72, the lateral shoulder/upper torso mechanism 250, and the lateral hip support mechanism 252 are located in the same position as depicted in FIGS. 1A-1C.

Figure 2B:
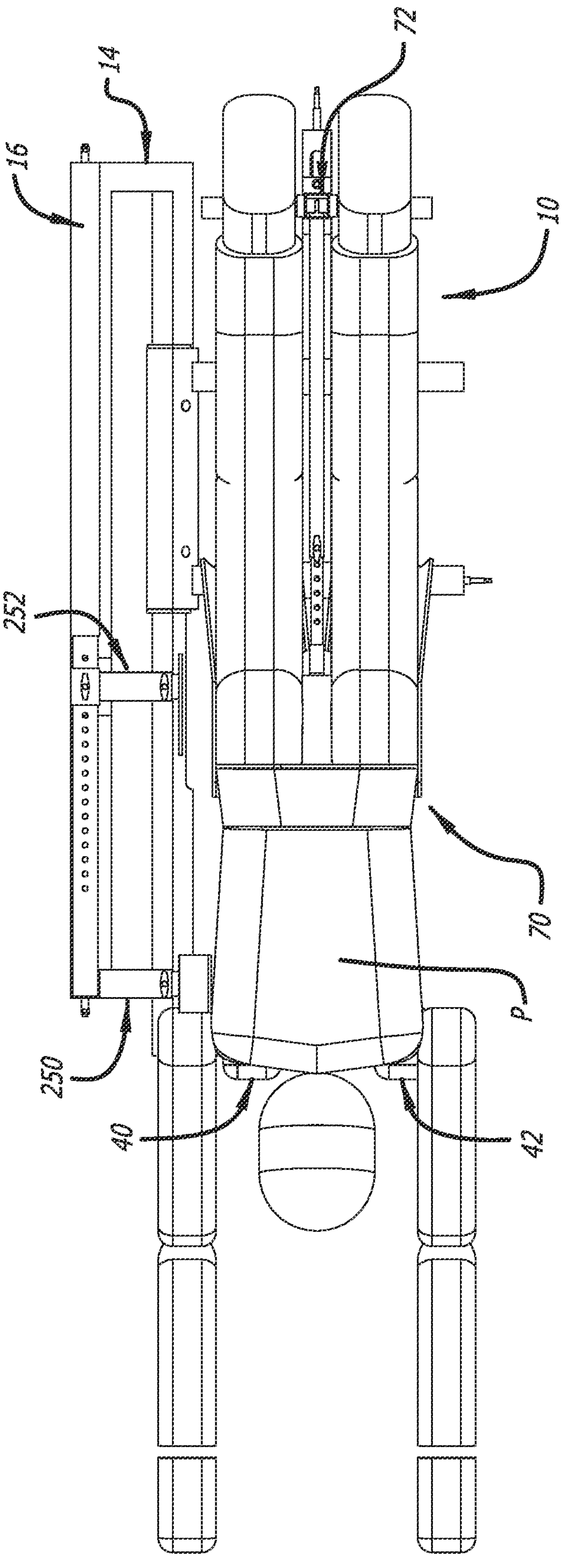
FIG. 2B is a top plan view of the surgical frame of FIG. 1A, the components thereof having been adjusted as shown in FIG. 2A to maintain the patient in the first position.
Figure 2C:
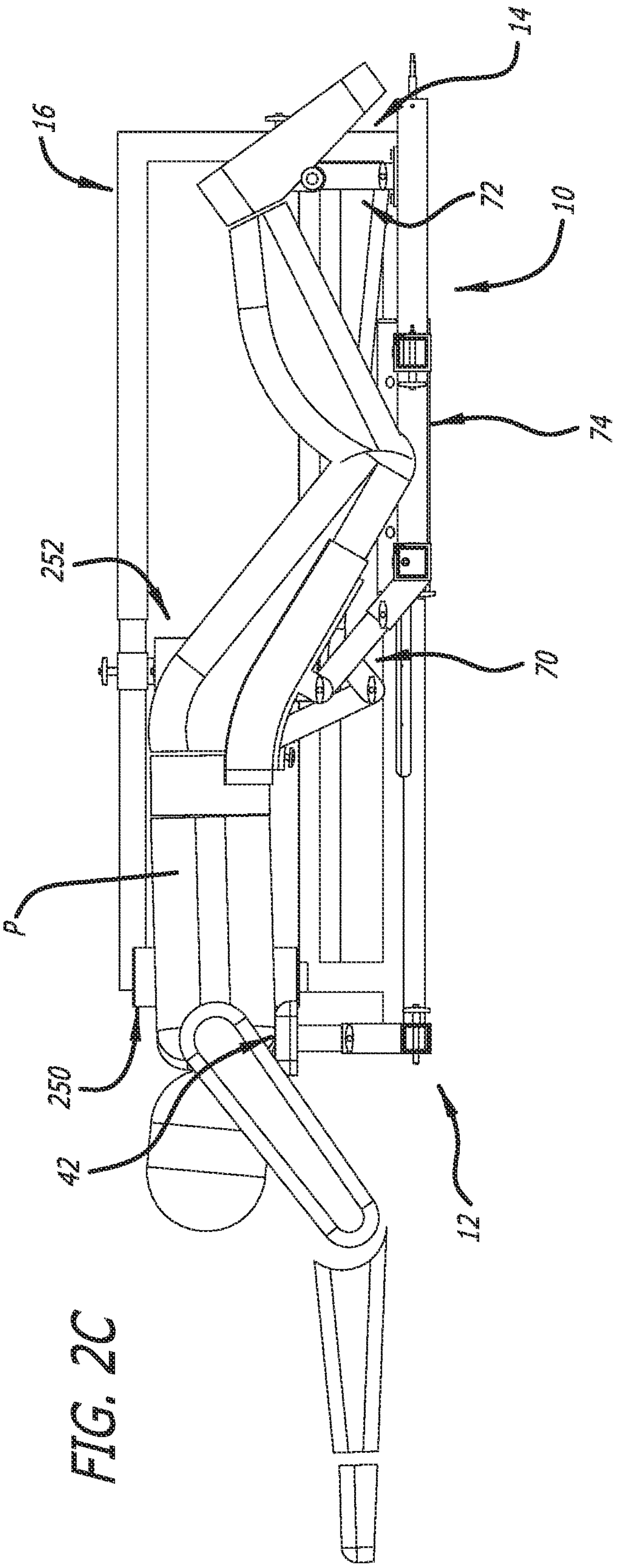
FIG. 2C is a side elevational view of the surgical frame of FIG. 1A, the components thereof having been adjusted as shown in FIG. 2A to maintain the patient in the first position.
Figure 3A:
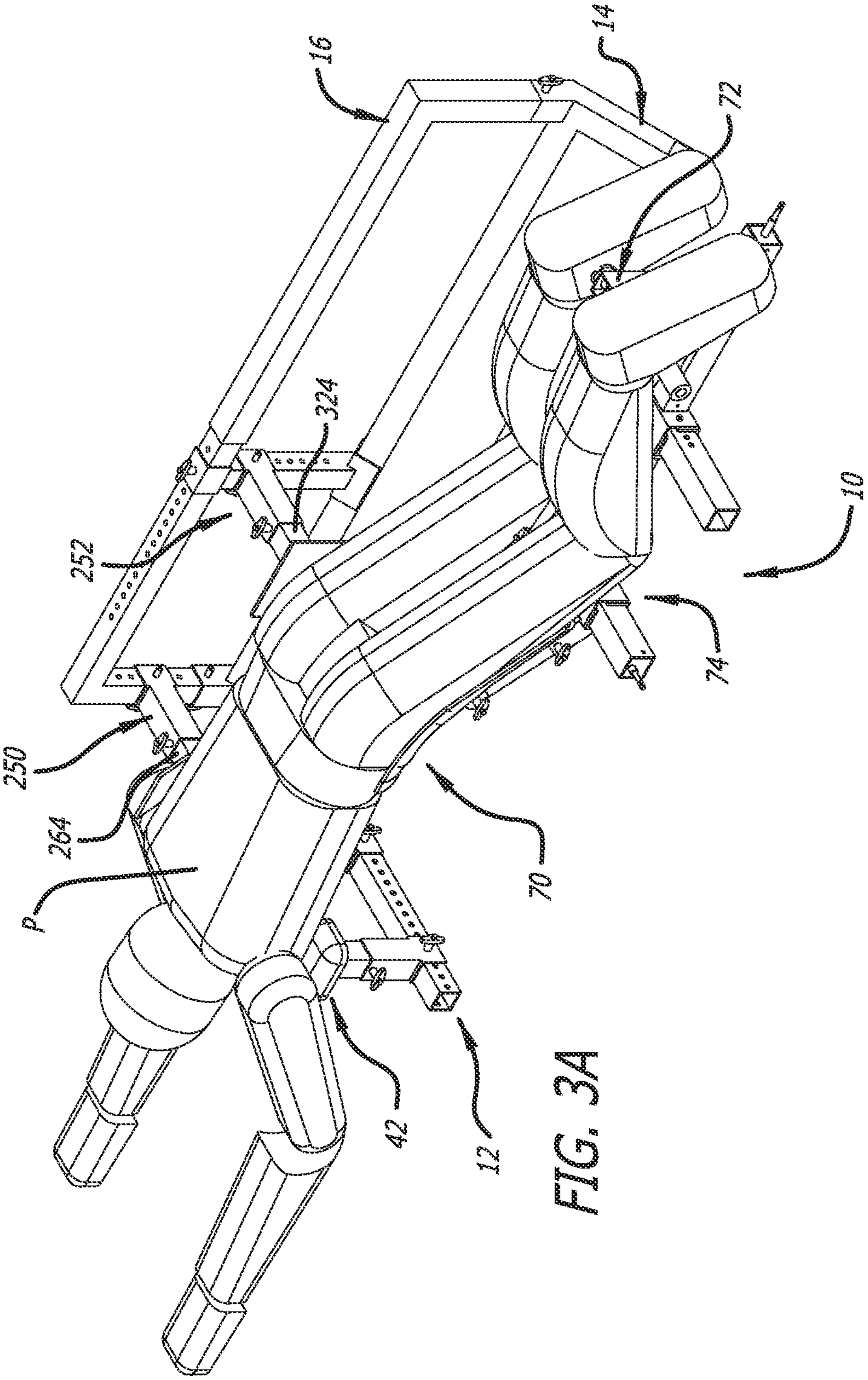
FIG. 3A is a top perspective view of the surgical frame of FIG. 1A, the components thereof having been adjusted to maintain the patient in a second position.
Figure 3B:
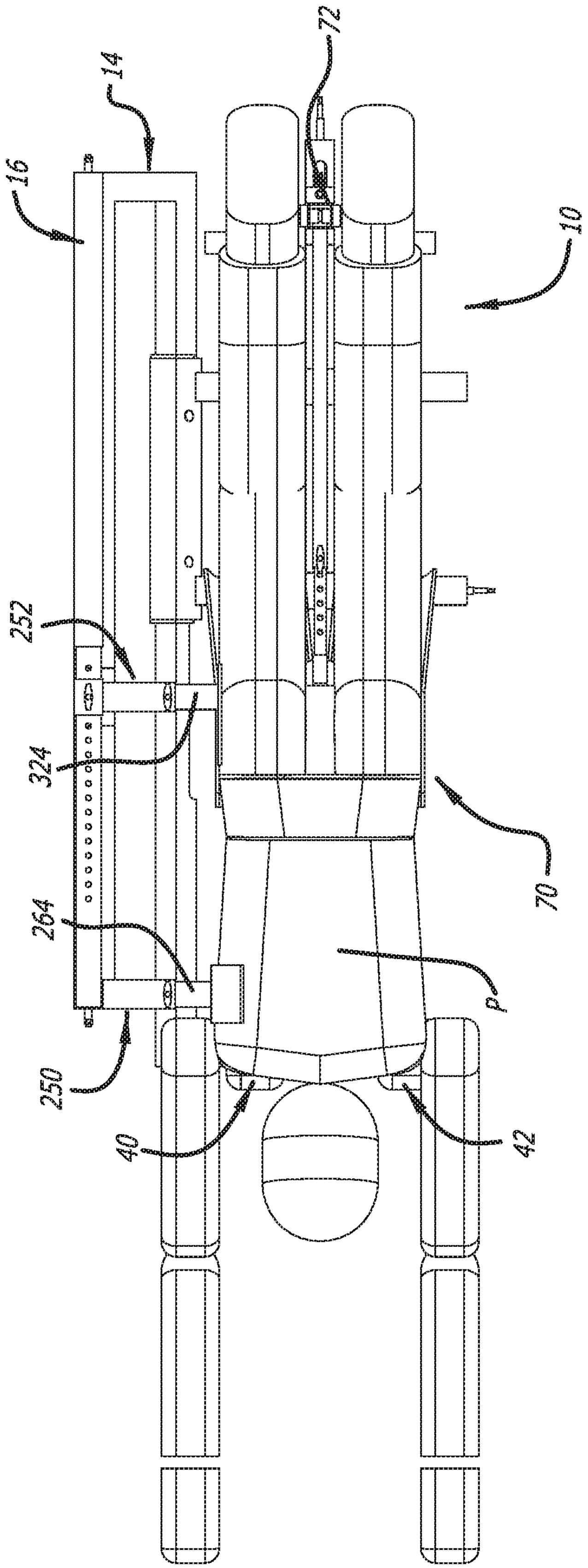
FIG. 3B is a top plan view of the surgical frame of FIG. 1A, the components thereof having been adjusted as shown in FIG. 3A to maintain the patient in the second position.
Figure 3C:
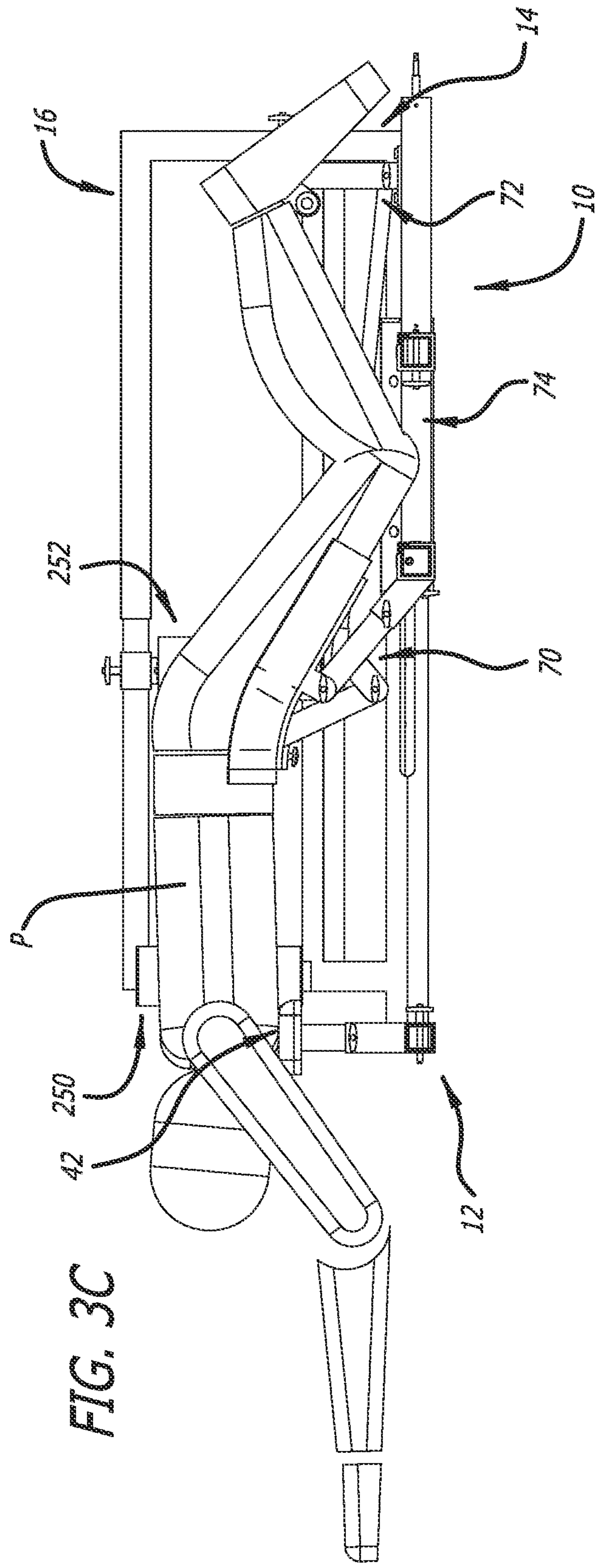
FIG. 3C is a side elevational view of the surgical frame of FIG. 1A, the components thereof having been adjusted as shown in FIG. 3A to maintain the patient in the second position.
Figure 4A:
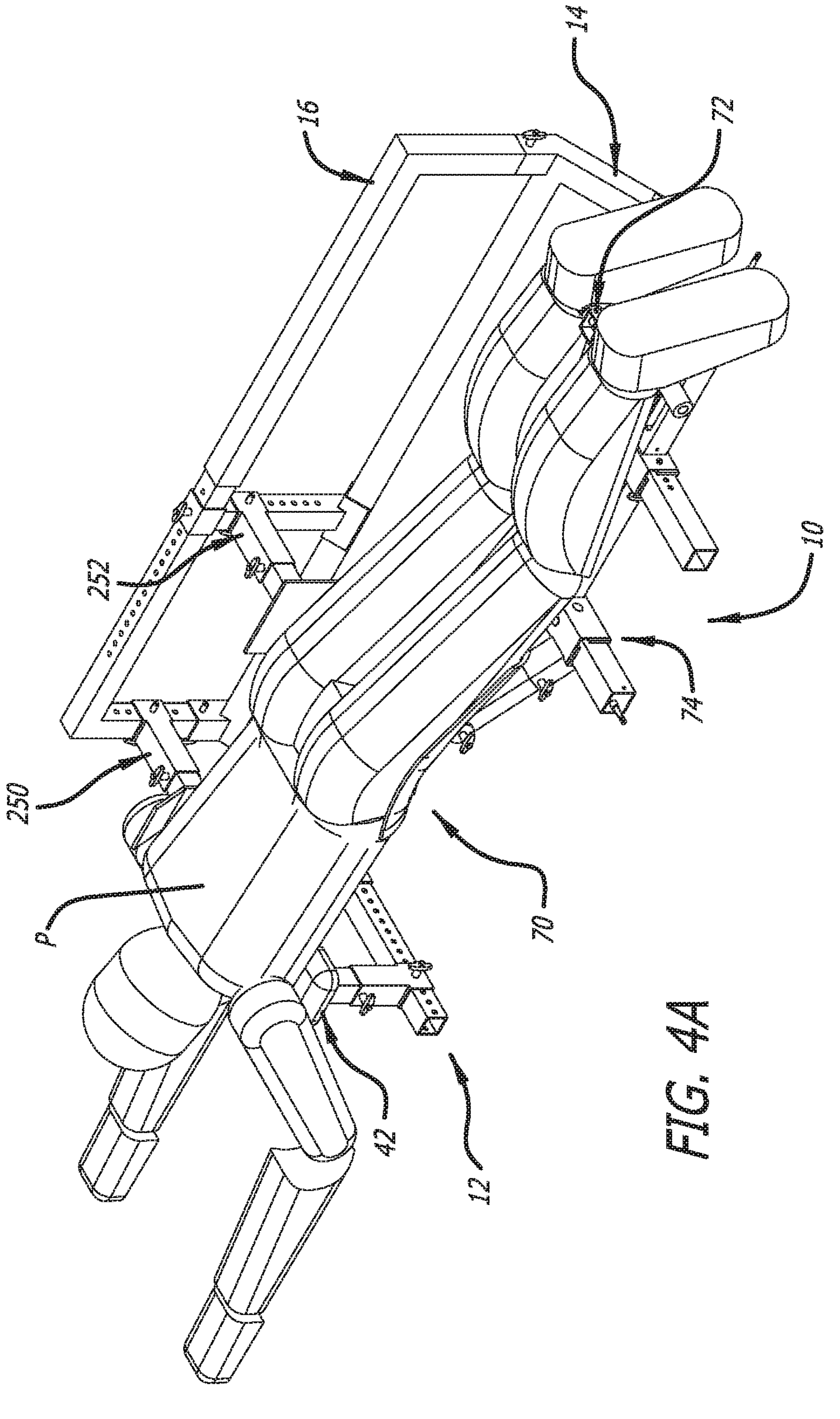
FIG. 4A is a top perspective view of the surgical frame of FIG. 1A, the components thereof having been adjusted to maintain the patient in a third position.
Figure 4B:
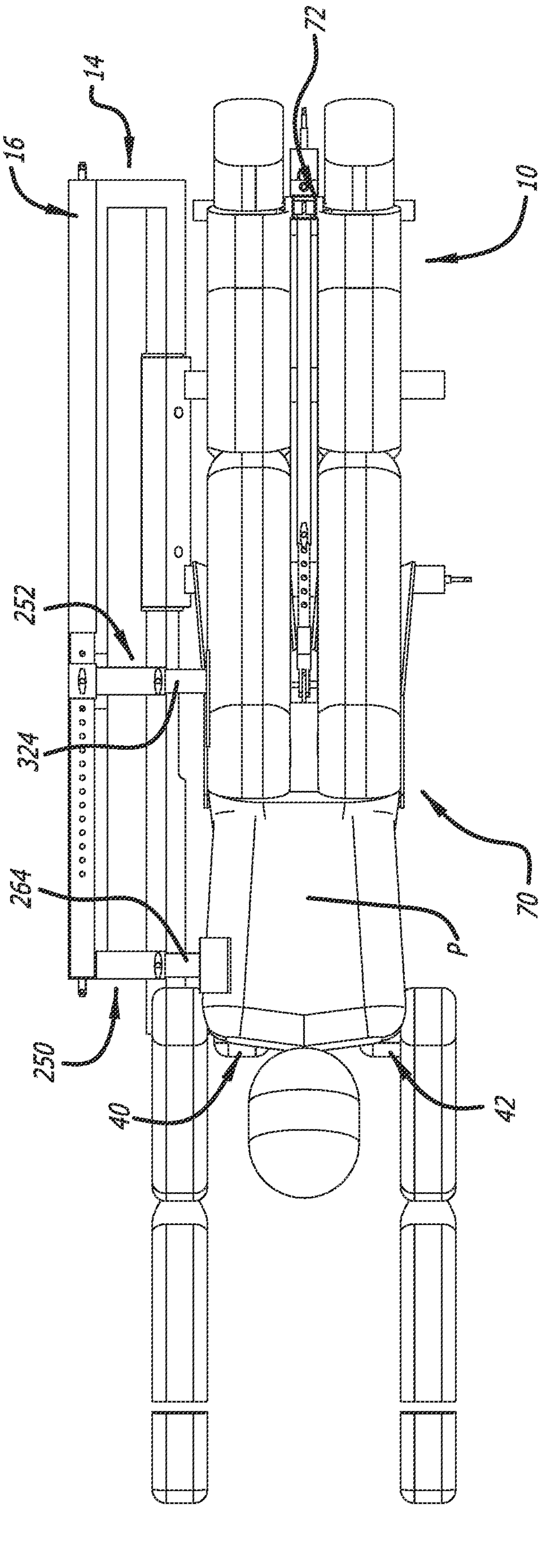
FIG. 4B is a top plan view of the surgical frame of FIG. 1A, the components thereof having been adjusted as shown in FIG. 4A to maintain the patient in the third position.
Figure 4C:
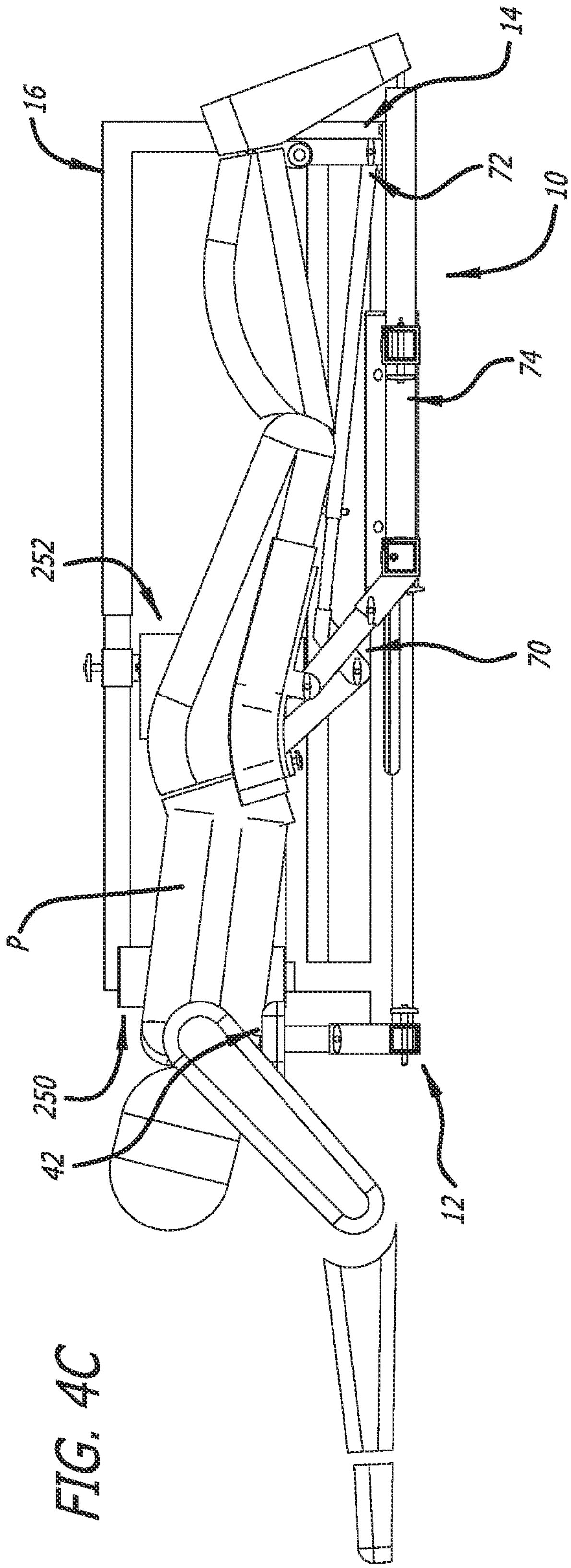
FIG. 4C is a side elevational view of the surgical frame of FIG. 1A, the components thereof having been adjusted as shown in FIG. 4A to maintain the patient in the third position.
Figure 5A:
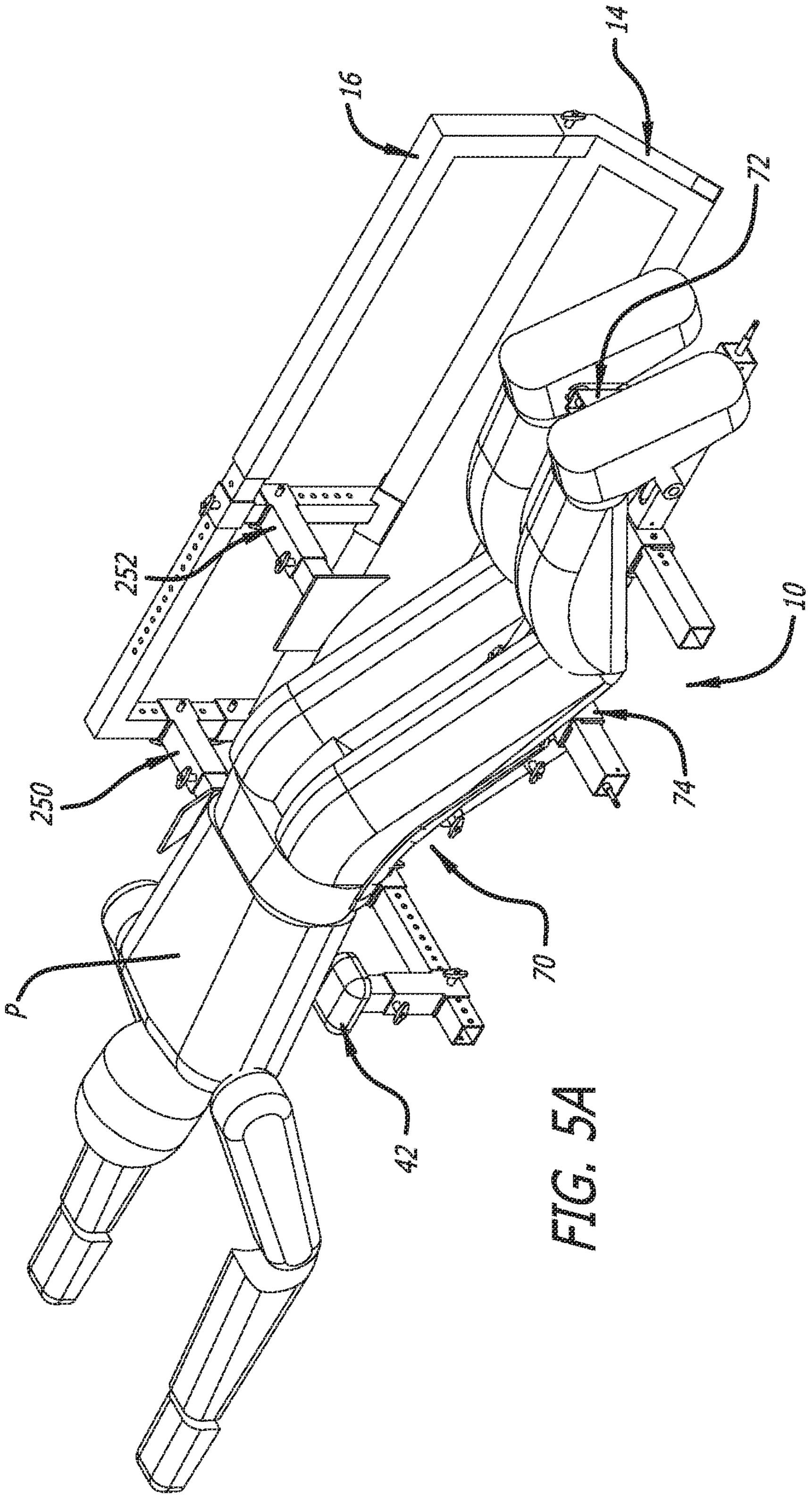
FIG. 5A is a top perspective view of the surgical frame of FIG. 1A, the components thereof having been adjusted to maintain the patient in a fourth position.
Figure 5B:
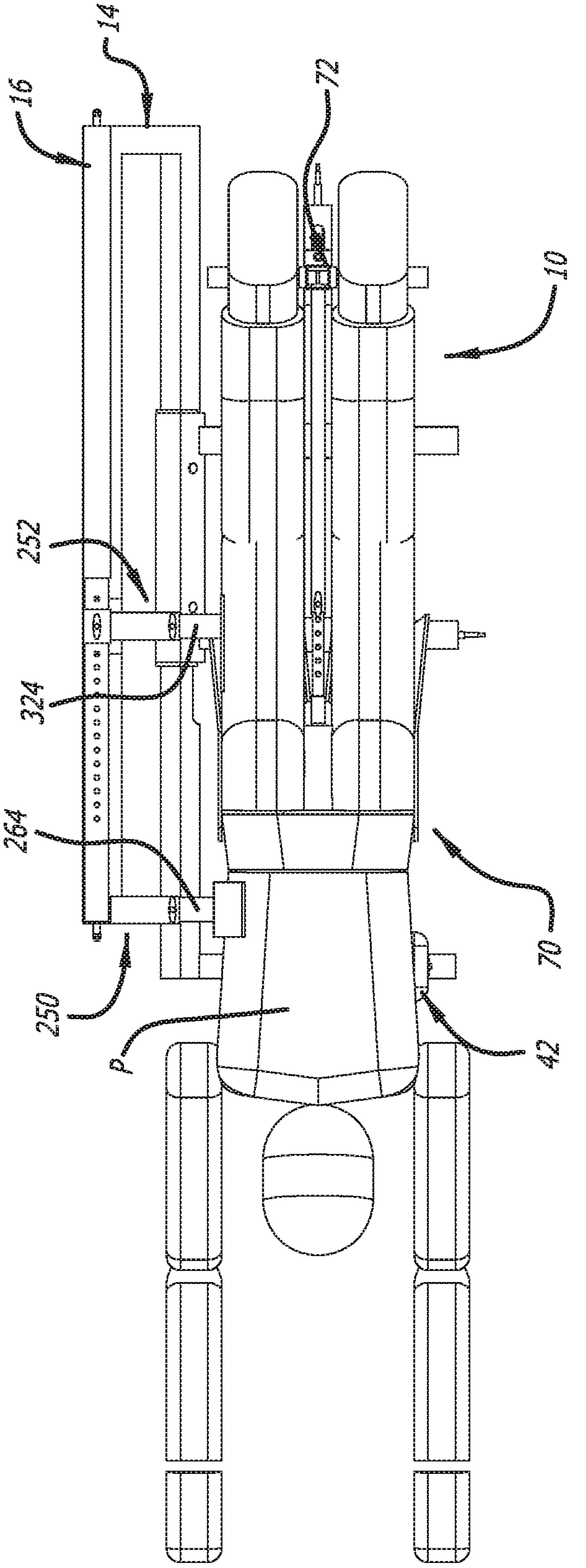
FIG. 5B is a top plan view of the surgical frame of FIG. 1A, the components thereof having been adjusted as shown in FIG. 5A to maintain the patient in the fourth position.
Figure 5C:
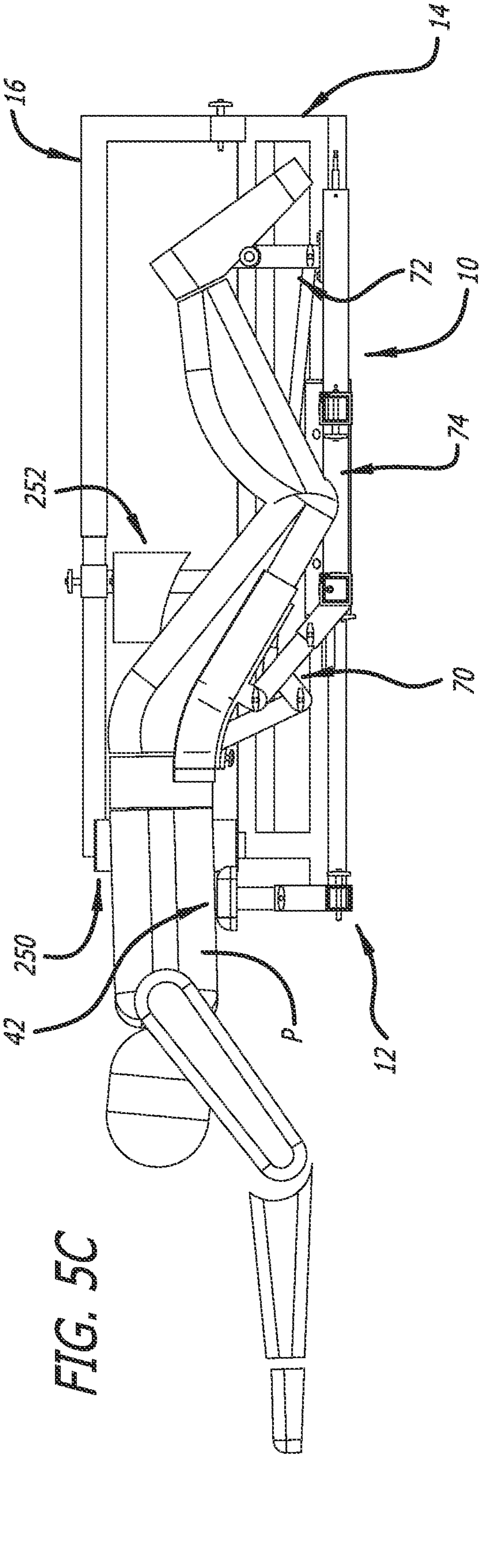
FIG. 5C is a side elevational view of the surgical frame of FIG. 1A, the components thereof having been adjusted as shown in FIG. 5A to maintain the patient in the fourth position.

As shown in FIGS. 2A-2C, the shoulder/upper torso contacting portion 266 of the lateral shoulder/upper torso mechanism 250 and the lateral hip-contacting portion 326 of the hip support mechanism 252 are disengaged from the body of the patient P, and the patient P is supported by the chest support pads 50 of the first and second chest support mechanisms 40 and 42, the patient support platform 130 of the hip and upper leg support mechanism 70, and the first and second foot supports 100 and 102 of the feet and lower leg support mechanism 72.

In comparison to FIGS. 2A-2C, FIGS. 3A-3C depict the lateral shoulder/upper torso contacting portion 266 of the shoulder/upper torso mechanism 250 having been placed into contact with the left shoulder of the patient P, and the hip-contacting portion 326 of the lateral hip support mechanism 252 having been placed into contact with the left hip of the patient.

In comparison to FIGS. 3A-3C, FIGS. 4A-4C depict the feet and lower leg support mechanism 72 having been moved away from the fourth frame member 34 to move the feet of the patient P, as well as the angle of the patient support platform 130 having been changed to adjust the angle of the hips of the patient P, to correspondingly increase the length of the patient P.

In comparison to FIGS. 4A-4C, FIGS. 5A-5C depict the moveable frame member 36 (and the sub-frame 74, and the hip and upper leg support mechanism 70 and the feet and lower leg support mechanism 72 supported by the sub-frame 74) having been moved toward the second frame member 30 to move the hips, legs, and feet of the patient P, as well as the angle of the patient support platform 130 having been changed to adjust the angle of the hips of the patient P, to correspondingly decrease the length of the patient P and also move the patient P relative to the chest support mechanisms 40 and 42.

In addition to the articulation afforded by the various mechanisms of the surgical frame 10, the orientation of the surgical frame 10 can also be changed during surgery. As depicted in FIGS. 1A-1C and 2A-5C, the surgical frame 10 is oriented to rest on the support surfaces 20 of the first portion 12 of the surgical frame 10. The patient P is supported in the prone position when the surgical frame 10 is oriented to rest on the support surfaces 20. The surgical frame 10 can be oriented to rest on the support surfaces 22 of the second portion 14 or rest on the support surfaces 24 of the third portion 16. When the surgical frame 10 is oriented to rest on the support surfaces 22, the patient is supported in the 45°-supported position, and, when the surface frame 10 is oriented to rest on the support surfaces 24, the patient is supported in the side-supported position. In the prone position, the weight of the patient P is primarily supported by the chest support mechanisms 40 and 42, the hip and upper leg support mechanism 70, and the feet and lower leg support mechanism 72. In the 45°-supported position, the weight of the patient P is primarily supported by the chest support mechanisms 40 and 42, the hip and upper leg support mechanism 70, the feet and lower leg support mechanism 72, the lateral shoulder/upper torso mechanism 250, and the lateral hip support mechanism 252. In the side-supported position, the weight of the patient P is primarily supported by the lateral shoulder/upper torso mechanism 250 and the lateral hip support mechanism 252. When the patient P is supported by the surgical frame 10 in the prone position, the patient P is in the 45°-supported position, or the patient is in the side-supported position, the various mechanisms of the surgical frame 10 can be adjusted to articulate portions of the body of the patient P. The different positions of the surgical frame 10 and patient P inherently afford different surgical approaches to the patient.

The entirety of the surgical frame 10 can be pivoted to adjust the position of a patient during surgery between a prone position and a lateral position. In a preferred embodiment of the surgical frame 10 the patient can be positioned in a prone position, a lateral position, or an angled position there between, such as at a 45 degree angle. In another alternative embodiment a surgical frame can be constructed in a similar manner to the surgical frame 10 described above except that an angled position between the prone and lateral positions is from 30 to 60 degrees, and more preferably between 35 to 55 degrees, and yet more preferably from 40 to 50 degrees, such as at 40 degrees by way of example, to best position a patient for surgical access depending on the particular procedure to be performed.

It is noted that a head support mechanism and support straps and belts are contemplated for use with the surgical frame 10. The head support mechanism can be part of the surgical frame or separate therefrom and is adjustable to correspond to the patient size and frame position. The straps and belts maintain the patient in proper position on the frame and assist in securing the patient during the transition between positions via movement of the frame onto different support surfaces.

Preferably the surgical frame 10 can be used in association with a traditional surgical table by placing the surgical frame 10 on top of the surgical table. The surgical frame 10 is preferably secured to the surgical table via straps, clamps, or other fastening device to ensure the surgical frame does not inadvertently move relative to the surgical table.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of adjusting a position of a patient during surgery on the patient using a surgical frame, the method comprising:

providing the surgical frame having a mid-longitudinal axis, a first frame member substantially aligned with the mid-longitudinal axis, a second frame member extending outwardly from the first frame member, a third frame member extending outwardly from the first frame member, an adjustable chest support including a first telescoping portion and a second telescoping portion, and an adjustable hip and upper leg support;

adjusting lateral positions of the first telescoping portion and the second telescoping portion of the chest support along the second frame member in a first direction transverse to the mid-longitudinal axis by changing spacing of the first telescoping portion and the second telescoping portion relative to the first frame member along the second frame member;

adjusting telescopic positions of the first telescoping portion and the second telescoping portion in second directions transverse to the mid-longitudinal axis by changing spacing of a first pad portion of the first telescoping portion and a second pad portion of the second telescoping portion relative to the second frame member;

supporting a chest of the patient on the first pad portion and the second pad portion after the adjusting of the lateral positions and the telescopic positions of the first telescoping portion and the second telescoping portion;

adjusting a position of the hip and upper leg support by moving a portion of the hip and upper leg support in a third direction transverse to the mid-longitudinal axis and relative to the third frame member;

supporting a hip portion and upper leg portions of the patient on the hip and upper leg support after the adjusting of the hip and upper leg support; and performing surgery on the patient;

wherein the adjusting of the lateral positions and the telescopic positions of the first telescoping portion and the second telescoping portion of the chest support accommodates dimensions or surgical needs of the patient.

2. The method of claim 1, further comprising moving the surgical frame into at least one of a first position, a second position, and a third position to respectively orient the patient in one of a prone orientation, a lateral orientation, and a position between the prone orientation and the lateral orientation relative to a support platform;

wherein the moving of the surgical frame can afford performance of the surgery on the patient in different coronal planar positions.

3. The method of claim 2, wherein the moving of the surgical frame into the first position includes contacting a first support surface to the support platform, the first support surface being formed on the first frame member, the second frame member, and the third frame member.

4. The method of claim 3, wherein the moving of the surgical frame into the second position includes contacting a second support surface to the support platform, the second support surface being formed on the first frame member, a fourth frame member extending outwardly from the first frame member, a fifth frame member extending outwardly from the first frame member, and a sixth frame member extending between the fourth frame member and the fifth frame member.

5. The method of claim 4, wherein the moving of the surgical frame into the third position includes contacting a third support surface to the support platform, the third support surface formed on the sixth frame member, a seventh frame member extending outwardly from the sixth frame member, an eighth frame member extending outwardly from the sixth frame member, and a ninth frame member extending between the seventh frame member and the eighth frame member.

6. The method of claim 2, wherein the coronal plane of the patient is oriented approximately horizontal when the surgical frame is in the first position and the patient is supported thereby, the coronal plane of the patient is oriented approximately 45° with respect to horizontal and vertical when the surgical frame is in the second position and the patient is supported thereby, and the coronal plane of the patient is oriented approximately vertical when the surgical frame is in the third position and the patient is supported thereby.

7. The method of claim 1, wherein adjusting the position of the hip and upper leg support includes moving a sub-frame supporting the hip and upper leg support and further includes moving the sub-frame in a fourth direction transverse to the mid-longitudinal axis and relative to the third frame member.

8. The method of claim 1, wherein the adjusting telescopic positions of the first telescoping portion and the second telescoping portion comprises increasing a height of one of the first pad portion and the second pad portion relative to the second frame member, and decreasing a height of the other of the first pad portion and the second pad portion relative to the second frame member.

9. The method of claim 8, further comprising moving the surgical frame into at least one of a first position, a second position, and a third position to respectively orient the patient in one of a prone orientation, a 45° orientation, and a lateral orientation relative to a support platform;

wherein the moving of the surgical frame can afford performance of the surgery on the patient in different coronal planar positions.

10. A method of adjusting a position of a patient during surgery on the patient using a surgical frame, the method comprising:

providing the surgical frame having a mid-longitudinal axis, a first frame member substantially aligned with the mid-longitudinal axis, a second frame member extending outwardly from the first frame member, and an adjustable chest support including a first telescoping portion and a second telescoping portion;

adjusting lateral positions of the first telescoping portion and the second telescoping portion of the chest support along the second frame member in a first direction transverse to the mid-longitudinal axis by changing spacing of the first telescoping portion and the second telescoping portion relative to the first frame member along the second frame member;

adjusting telescopic positions of the first telescoping portion and the second telescoping portion in second directions transverse to the mid-longitudinal axis by changing spacing of a first pad portion of the first telescoping portion and a second pad portion of the second telescoping portion relative to the second frame member;

supporting a chest of the patient on the first pad portion and the second pad portion after the adjusting of the lateral positions and the telescopic positions of the first telescoping portion and the second telescoping portion; and performing surgery on the patient;

wherein the adjusting of the lateral positions and the telescopic positions of the first telescoping portion and the second telescoping portion of the chest support accommodates dimensions or surgical needs of the patient.

11. The method of claim 10, further comprising moving the surgical frame into at least one of a first position, a second position, and a third position to respectively orient the patient in one of a prone orientation, a lateral orientation, and a position between the prone orientation and the lateral orientation relative to a support platform;

wherein the moving of the surgical frame can afford performance of the surgery on the patient in different coronal planar positions.

12. The method of claim 11, wherein the moving of the surgical frame into the first position includes contacting a first support surface to the support platform, the first support surface being formed on the first frame member, the second frame member, and the third frame member.

13. The method of claim 12, wherein the moving of the surgical frame into the second position includes contacting a second support surface to the support platform, the second support surface being formed on the first frame member, a fourth frame member extending outwardly from the first frame member, a fifth frame member extending outwardly from the first frame member, and a sixth frame member extending between the fourth frame member and the fifth frame member.

14. The method of claim 13, wherein the moving of the surgical frame into the third position includes contacting a third support surface to the support platform, the third support surface formed on the sixth frame member, a seventh frame member extending outwardly from the sixth frame member, an eighth frame member extending outwardly from the sixth frame member, and a ninth frame member extending between the seventh frame member and the eighth frame member.

15. The method of claim 11, wherein the coronal plane of the patient is oriented approximately horizontal when the surgical frame is in the first position and the patient is supported thereby, the coronal plane of the patient is oriented approximately 45° with respect to horizontal and vertical when the surgical frame is in the second position and the patient is supported thereby, and the coronal plane of the patient is oriented approximately vertical when the surgical frame is in the third position and the patient is supported thereby.

16. The method of claim 10, wherein the adjusting telescopic positions of the first telescoping portion and the second telescoping portion comprises increasing a height of one of the first pad portion and the second pad portion relative to the second frame member, and decreasing a height of the other of the first pad portion and the second pad portion relative to the second frame member.

17. A method of adjusting a position of a patient during surgery on the patient using a surgical frame, the method comprising:

providing the surgical frame having a mid-longitudinal axis, a first frame member substantially aligned with the mid-longitudinal axis, a second frame member extending outwardly from the first frame member, a third frame member extending outwardly from the first frame member, an adjustable chest support including a first telescoping portion and a second telescoping portion, and an adjustable hip and upper leg support;

adjusting lateral positions of the first telescoping portion and the second telescoping portion of the chest support along the second frame member in a first direction transverse to the mid-longitudinal axis by changing spacing of the first telescoping portion and the second telescoping portion relative to the first frame member along the second frame member;

adjusting telescopic positions of the first telescoping portion and the second telescoping portion in second directions transverse to the mid-longitudinal axis by increasing a height of one of the first pad portion and the second pad portion relative to the second frame member, and decreasing a height of the other of the first pad portion and the second pad portion relative to the second frame member;

supporting a chest of the patient on the first pad portion and the second pad portion after the adjusting of the lateral positions and the telescopic positions of the first telescoping portion and the second telescoping portion;

adjusting a position of the hip and upper leg support by moving a portion of the hip and upper leg support in a third direction transverse to the mid-longitudinal axis and relative to the third frame member;

supporting a hip portion and upper leg portions of the patient on the hip and upper leg support after the adjusting of the hip and upper leg support;

moving the surgical frame into at least one of a first position, a second position, and a third position to respectively orient the patient in one of a prone orientation, a lateral orientation, and a position between the prone orientation and the lateral orientation relative to a support platform; and performing surgery on the patient;

wherein the adjusting of the lateral positions and the telescopic positions of the first telescoping portion and the second telescoping portion of the chest support accommodates dimensions or surgical needs of the patient.

18. The method of claim 17, wherein the moving of the surgical frame into the first position includes contacting a first support surface to the support platform, the first support surface being formed on the first frame member, the second frame member, and the third frame member.

19. The method of claim 18, wherein the moving of the surgical frame into the second position includes contacting a second support surface to the support platform, the second support surface being formed on the first frame member, a fourth frame member extending outwardly from the first frame member, a fifth frame member extending outwardly from the first frame member, and a sixth frame member extending between the fourth frame member and the fifth frame member.

20. The method of claim 19, wherein the moving of the surgical frame into the third position includes contacting a third support surface to the support platform, the third support surface formed on the sixth frame member, a seventh frame member extending outwardly from the sixth frame member, an eighth frame member extending outwardly from the sixth frame member, and a ninth frame member extending between the seventh frame member and the eighth frame member.

* * * * *